United States Patent
Heo et al.

(10) Patent No.: US 11,279,376 B2
(45) Date of Patent: Mar. 22, 2022

(54) VEHICLE CONTROL DEVICE AND VEHICLE CONTROL METHOD

(71) Applicant: LG Electronics Inc., Seoul (KR)

(72) Inventors: Heejeong Heo, Seoul (KR); Doyun Park, Seoul (KR); Dongkyu Lee, Seoul (KR); Jaehoon Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 16/486,095

(22) PCT Filed: Nov. 30, 2018

(86) PCT No.: PCT/KR2018/015151
§ 371 (c)(1),
(2) Date: Aug. 14, 2019

(87) PCT Pub. No.: WO2020/111351
PCT Pub. Date: Jun. 4, 2020

(65) Prior Publication Data
US 2021/0331689 A1 Oct. 28, 2021

(51) Int. Cl.
*B60W 50/14* (2020.01)
*B60W 60/00* (2020.01)
(Continued)

(52) U.S. Cl.
CPC .......... *B60W 50/14* (2013.01); *B60W 40/08* (2013.01); *B60W 60/001* (2020.02);
(Continued)

(58) Field of Classification Search
CPC .......... B60W 50/14; B60W 2420/42; B60W 2540/225; B60W 2050/146;
(Continued)

(56) References Cited

U.S. PATENT DOCUMENTS

2017/0221480 A1* 8/2017 Tzirkel-Hancock ........................ B60W 50/10
2017/0300831 A1 10/2017 Gelfenbeyn et al.

FOREIGN PATENT DOCUMENTS

JP 1999126089 5/1999
JP 2005186797 7/2003
(Continued)

OTHER PUBLICATIONS

PCT International Search Report in International Appln. No. PCT/KR2018/015151, dated Aug. 14, 2019, 5 pages (with English translation).
(Continued)

*Primary Examiner* — Yuen Wong
(74) *Attorney, Agent, or Firm* — Fish & Richardson P.C.

(57) ABSTRACT

Disclosed is a control method. The control method of the present invention is a control method for controlling a vehicle using an agent module which outputs a dialogue-type response to an input speaking of an occupant, the method including: activating the agent module through a predetermined input; generating a first dialogue with the occupant through an activated voice input unit; maintaining the first dialogue in a temporary stored state for a preset period of time; and loading the first dialogue in the temporary stored state when a call command for the first dialogue is recognized, and generating a second dialogue when the call command for the first dialogue is recognized after elapse of the preset period of time.

18 Claims, 23 Drawing Sheets

140f

The current travel mode is a manual driving mode.
The travel mode of Dialogue 1 is an autonomous driving mode.
Would you like to change the current travel mode
to the autonomous driving mode?

Yes / No

(51) Int. Cl.
*B60W 40/08* (2012.01)
*G06F 3/01* (2006.01)
*G06F 3/0482* (2013.01)
*G06F 3/16* (2006.01)
*G06K 9/00* (2022.01)
*G10L 15/18* (2013.01)
*G10L 15/22* (2006.01)

(52) U.S. Cl.
CPC ......... *B60W 60/0051* (2020.02); *G06F 3/013* (2013.01); *G06F 3/0482* (2013.01); *G06F 3/167* (2013.01); *G06K 9/00335* (2013.01); *G10L 15/1815* (2013.01); *G10L 15/22* (2013.01); *B60W 2050/146* (2013.01); *B60W 2420/42* (2013.01); *B60W 2540/225* (2020.02); *G10L 2015/223* (2013.01)

(58) Field of Classification Search
CPC ............ B60W 60/0051; B60W 40/08; B60W 60/001; G06K 9/00335; G06F 3/013; G06F 3/0482; G06F 3/167; G10L 2015/223; G10L 15/22; G10L 15/1815
See application file for complete search history.

(56) References Cited

FOREIGN PATENT DOCUMENTS

| | | |
|---|---|---|
| JP | 2004289803 | 10/2004 |
| JP | 2005215694 | 8/2005 |
| JP | 2005283531 | 10/2005 |
| JP | 2005352761 | 12/2005 |
| KR | 1020020020585 | 3/2002 |
| WO | WO2017200076 | 11/2017 |

OTHER PUBLICATIONS

Korean Office Action in Korean Appln. No. 10-2019-7019217, dated Jun. 23, 2020, 14 pages (with English translation).
Korean Notice of Allowance in Korean Application No. 10-2019-7019217, dated Sep. 15, 2020, 6 pages (with English translation).

* cited by examiner

VEHICLE CONTROL DEVICE AND VEHICLE CONTROL METHOD

CROSS-REFERENCE TO RELATED APPLICATIONS

This application is a National Stage application under 35 U.S.C. § 371 of International Application No. PCT/KR2018/015151, filed on Nov. 30, 2018, the disclosure of which is hereby incorporated by reference in its entirety.

TECHNICAL FIELD

The present invention relates to a vehicle control device and a vehicle control method.

BACKGROUND ART

Vehicles may be classified as internal combustion engine vehicles, external combustion engine vehicles, gas turbine vehicles, electric vehicles, and the like, according to types of prime movers used therein.

Recently, for the safety and convenience of drivers and pedestrians, smart vehicles have been actively developed and research into sensors to be mounted on the intelligent vehicles have actively been conducted. Cameras, infrared sensors, radars, global positioning systems (GPS), lidars, and gyroscopes are used in intelligent vehicles, among which cameras serve to substitute for human eyes.

Due to development of various sensors and electronic equipment, vehicles equipped with a driving assistance function of assisting an occupant in driving and improving driving safety and convenience has come to prominence.

DISCLOSURE

Technical Problem

An embodiment of the present invention provides a control device for assisting driving of a vehicle.

Another embodiment of the present invention provides a control device enabling conversation with an occupant during traveling.

Yet another embodiment of the present invention provides a control device capable of providing information desired by an occupant in response to speaking of the occupant during traveling.

Yet another embodiment of the present invention provides a control device capable of loading a pre-stored dialogue in response to a speaking of an occupant during traveling.

Yet another embodiment of the present invention provides a control device capable of providing a context dialogue to resume conversation with an occupant when the conversation is temporarily interrupted.

Yet another embodiment of the present invention provides a control method for driving assistance of a vehicle.

Yet another embodiment of the present invention provides a control method for enabling conversation with an occupant during traveling.

Yet another embodiment of the present invention provides a control method for providing information desired by an occupant in response to speaking of the occupant during traveling.

Yet another embodiment of the present invention provides a control device capable of loading a pre-stored dialogue in response to a speaking of an occupant during traveling.

Yet another embodiment of the present invention provides a control device capable of providing a context dialogue to resume conversation with an occupant when the conversation is temporarily interrupted.

Technical Solution

A control method according to at least one aspect of the present invention for the purpose of achieving the above objects is a control method for controlling a vehicle using an agent module which outputs a dialogue-type response to an input speaking of an occupant, the method including: activating the agent module through a predetermined input; generating a first dialogue with the occupant through an activated voice input unit; maintaining the first dialogue in a temporary stored state for a preset period of time; and loading the first dialogue in the temporary stored state when a call command for the first dialogue is recognized, and generating a second dialogue when the call command for the first dialogue is recognized after elapse of the preset period of time.

The generating of the first dialogue may be performed for a first period of time.

The preset period of time may be defined as a second period of time which comes after the first period of time, and which is longer than the first period of time.

When the call command for the first dialogue is recognized within the preset period of time, at least a part of the first dialogue in the temporary stored state may be loaded.

The preset period of time may be variably adjusted according to an event that occurs while the first dialogue is generated.

When it is determined through a camera in the vehicle that communication between the occupant and the agent module is temporarily interrupted while the first dialogue is generated, the preset period of time may be controlled to extend by a period of time for which the communication is interrupted.

The control method may further include: displaying at least one content related to at least one of the following: the speaking of the occupant and the response of the agent module, which form the first dialogue, and wherein, while the first dialogue is generated, a gaze of the occupant is monitored through a camera in the vehicle, and, when it is determined that the occupant has been gazing at a specific content for a predetermined period of time, the preset period of time is controlled to extend.

The control method may further include displaying a content related to at least one of the following: the speaking of the occupant and the response of the agent module, which form the first dialogue, wherein, when a plurality of contents related to the at least one exists, the preset period of time is controlled to extend until an input for selecting a specific content from among the plurality of contents is received.

The event may include an event of receiving a call, and, when the agent module automatically responds to the received call, the preset period of time may be controlled to extend by a period of time for which an automatic response operation is performed by the agent module.

The control method may further include, when no call command for the first dialogue has been recognized for the preset period of time, storing, in a memory, the first dialogue maintained in the temporary stored state.

The first dialogue may include at least one of the following: a time point when the occupant speaks, location information of the vehicle, route information, a destination, a start location, a waypoint, speaking content of the occupant, and response content of the agent module.

The control method may further include: receiving a speaking of the occupant through the voice input unit while the first dialogue is temporarily stored and the agent module is deactivated within the preset period of time; and, when any one information item contained in the first dialogue is contained in the speaking of the occupant, reactivating the agent module.

The control method may further include: after the agent module is re-activated, receiving a speaking of the occupant through the voice input unit; when any one information item in information contained in the first dialogue is selected through the speaking of the occupant, re-activating the first dialogue; and, when there is no matching information item between the speaking of the occupant and the information contained in the first dialogue, generating a third dialogue.

The control method may further include, when the information contained in the first dialogue includes at least one topic capable of being classified as a category and the speaking of the occupant is recognized as selecting any one subject among the at least one subject, constructing a context dialogue so that conversation with the occupant about the selected topic resumes subsequent to a time point stored right before the first dialogue is re-activated.

The control method further comprises: displaying, on a display, a plurality of stored dialogues generated by the agent module; and, when any one of the plurality of dialogues is selected through the speaking of the occupant, re-activating the selected dialogue.

The vehicle may be capable of being controlled in any one travel mode from the following: a first travel mode in which the vehicle is manually controlled by the occupant, a second travel mode in which the vehicle is controlled in a partially autonomous traveling state, and a third travel mode in which the vehicle is capable of maintaining an autonomous traveling state without manipulation of the occupant, and the control method may further include: in a case where the first dialogue is to be loaded, determining the travel mode when the first dialogue is generated; determining a current travel mode; and, when a travel mode corresponding to a generation time of the first dialogue matches the current travel mode, loading the first dialogue.

The control method may further include: when a request to load a dialogue generated in a travel mode of a level equal to or higher than the second travel mode is received while the vehicle is controlled in the first travel mode, restricting loading of the requested dialogue; and guiding transition of the travel mode of the vehicle to the level equal to or higher than the second travel mode.

The control method may further include: when a predetermined period of time has elapsed after the transition of the travel mode is guided, transitioning the travel mode to the second mode; and loading the requested dialogue.

The generating of the second dialogue may include generating the second dialogue when the first dialogue does not exist in pre-stored dialogues after a call command for the first dialogue is received.

The control method may further include deactivating the voice input unit when the first period of time elapses.

Advantageous Effects

The control device according to the present invention have effects as follows.

According to at least one of the embodiments of the present invention, a control device for driving assistance of a vehicle may be provided.

According to at least one of the embodiments of the present invention, a control device enabling conversation with an occupant during traveling may be provided.

According to at least one of the embodiments of the present invention, a control device capable of providing information desired by an occupant in response to speaking of the occupant during traveling may be provided.

According to at least one of the embodiments of the present invention, a control device capable of loading a pre-stored dialogue in response to a speaking of an occupant during traveling may be provided.

According to at least one of the embodiments of the present invention, a control device capable of providing a context dialogue to resume conversation with an occupant when the conversation is temporarily interrupted may be provided.

The control method according to the present invention have effects as

According to at least one of the embodiments of the present invention, a control method for driving assistance of a vehicle may be provided.

According to at least one of the embodiments of the present invention, a control method for enabling conversation with an occupant during traveling may be provided.

According to at least one of the embodiments of the present invention, a control method for providing information desired by an occupant in response to speaking of the occupant during traveling may be provided.

According to at least one of the embodiments of the present invention, a control method for loading a pre-stored dialogue in response to a speaking of an occupant during traveling may be provided.

According to at least one of the embodiments of the present invention, a control method for providing a context dialogue to resume conversation with an occupant when the conversation is temporarily interrupted may be provided.

MODE FOR INVENTION

Figure 1:
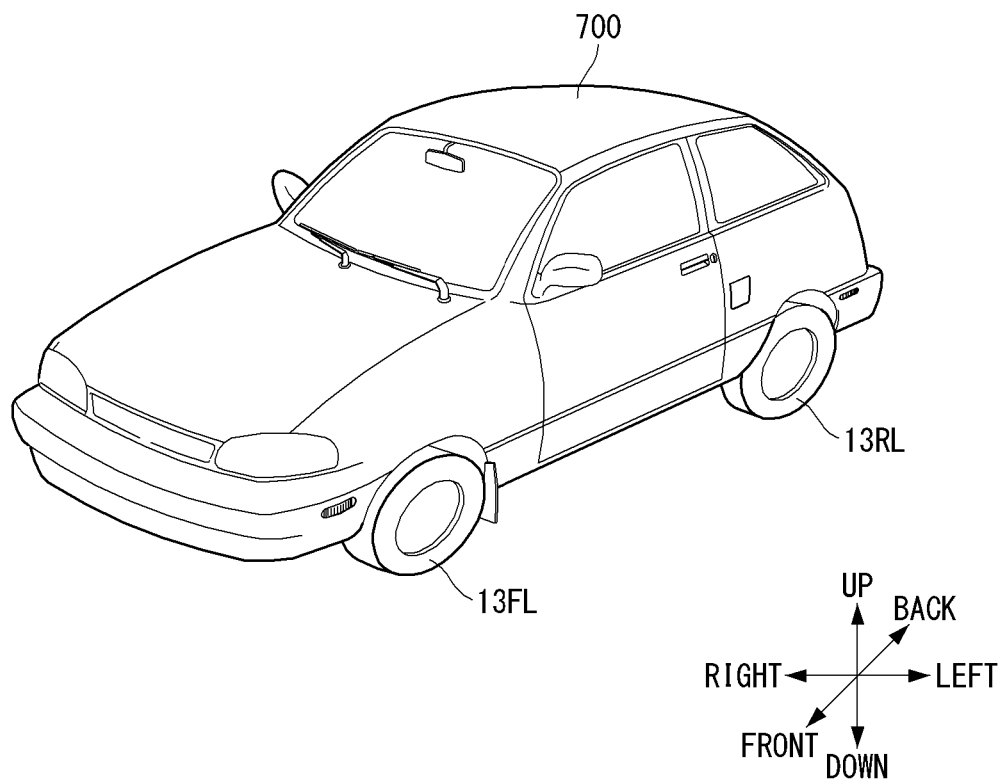
FIG. 1 shows an exterior appearance of a vehicle including a control device according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle as described in this specification may include a car and a motorcycle.

Hereinafter, a car will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

In some implementations, a left hand drive (LHD) vehicle will be assumed unless otherwise stated.

Hereinafter, a user, a driver, an occupant, and a fellow occupant may be mixed according to an embodiment.

In the following description, a control device 100, a separate device provided in a vehicle, executes a vehicle driving assistance function, while exchanging necessary information with the vehicle through data communication. However, an aggregation of some of the units of the vehicle may also be defined as the control device 100. The control device 100 may also be referred to as a vehicle control device 100, a vehicle driving assistance device 100, or a driving assistance device 100.

When the control device 100 is a separate device, at least some of the respective units of the control device 100 (see FIG. 3) may not be included in the control device 100 but may be units of a different device embedded in the vehicle. The external units may be interpreted as being included in the control device 100 by transmitting and receiving data through an interface unit of the control device 100.

For the purposes of description, the control device 100 according to an embodiment will be described as directly including the units shown in FIG. 3.

Hereinafter, the control device 100 according to an embodiment will be described in detail with reference to the drawings.

Referring to FIG. 1, a vehicle according to an embodiment may include wheels 13FL and 13RL rotated by a power source and the control device 100 providing driving assistance information to a user.

Figure 2:
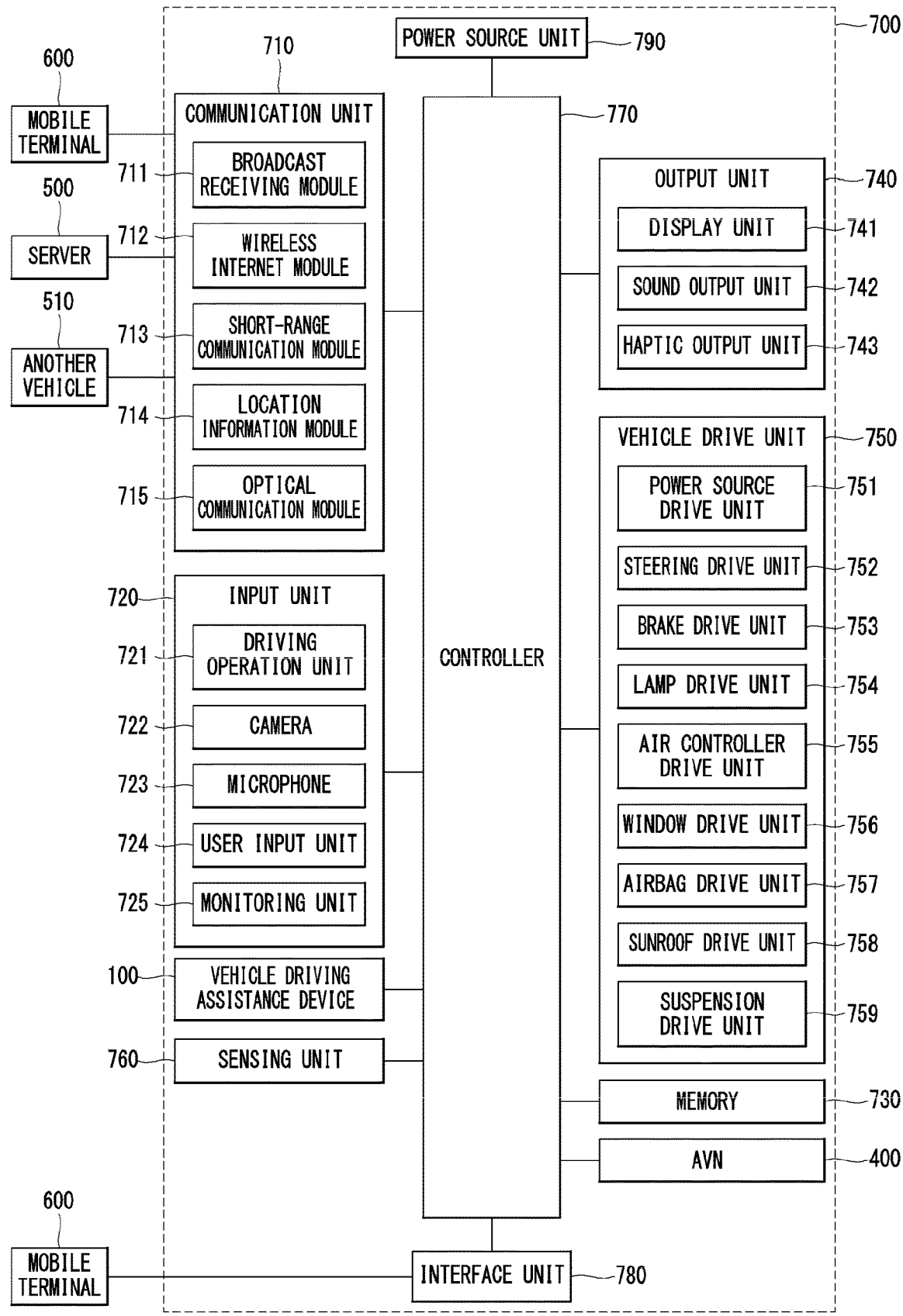
FIG. 2 is an example of an internal block diagram of a vehicle/

Referring to FIG. 2, the vehicle may include a communication unit 710, an input unit 720, a sensing unit 760, an output unit 740, a vehicle drive unit 750, a memory 730, an interface unit 780, a controller 770, a power source unit 790, the driver assistance apparatus 100, and an AVN apparatus 400. The communication unit 710 may include one or more modules to enable the wireless communication between a vehicle 700 and a mobile terminal 600, between the vehicle 700 and an external server 510, or between the vehicle 700 and another vehicle. In addition, the communication unit 710 may include one or more modules to connect the vehicle 700 to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 510 in a wireless manner. The wireless Internet module 712 may receive weather information and road traffic state information (e.g., Transport Protocol Expert Group (TPEG) information) from the external server 510.

The short-range communication module 713 may assist short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user gets into the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDPs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 700. For example, the light emitting unit may be at least one selected from among a headlight, a taillight, a brake light, a turn signal light, and a sidelight. For example, the optical communication module 715 may exchange data with another vehicle 520 via optical communication.

The input unit 720 may include a driving operation unit 721, the camera 722, a microphone 723, and the user input unit 724.

The driving operation unit 721 is configured to receive user input for the driving of the vehicle 700. The driving operation unit 721 may include the steering input unit 721*a*, a shift input unit 721*b*, an acceleration input unit 721*c*, and a brake input unit 721*d*.

The steering input unit 721*a* is configured to receive user input with regard to the direction of travel of the vehicle 700. The steering input unit 721*a* may take the form of the steering wheel 12 as illustrated in FIG. 1. In some embodiments, the steering input unit 721*a* may be configured as a touchscreen, a touch pad, or a button.

The shift input unit 721*b* is configured to receive input for selecting one of Park (P), Drive (D), Neutral (N) and Reverse (R) gears of the vehicle 700 from the user. The shift input unit 721*b* may have a lever form. In some embodiments, the shift input unit 721*b* may be configured as a touchscreen, a touch pad, or a button.

The acceleration input unit 721*c* is configured to receive user input for the acceleration of the vehicle 700. The brake input unit 721*d* is configured to receive user input for the speed reduction of the vehicle 700. Each of the acceleration input unit 721*c* and the brake input unit 721*d* may have a pedal form. In some embodiments, the acceleration input unit 721*c* or the brake input unit 721*d* may be configured as a touchscreen, a touch pad, or a button.

The camera 722 may include an image sensor and an image processing module. The camera 722 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 700 may include the camera 722 to capture a forward image or a surround-view image of the vehicle and an monitoring unit 725 to capture an image of the inside of the vehicle.

The monitoring unit 725 may capture an image of an occupant. The monitoring unit 725 may capture an image of biometrics of the occupant.

Meanwhile, although FIG. 2 illustrates the camera 722 as being included in the input unit 720, the camera 722 may be described as being a component of the driver assistance apparatus 100 as described above with reference to FIGS. 2 to 6.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

Meanwhile, in some embodiments, the camera 722 or the microphone 723 may be components of the sensing unit 760, other than components of the input unit 720.

The user input unit 724 is configured to receive information from the user. When information is input via the user input unit 724, the controller 770 may control the operation of the vehicle 700 to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to detect signals associated with, for example, the traveling of the vehicle 700. To this end, the sensing unit 760 may include a collision sensor, a steering sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor on the basis of the rotation of a steering wheel, a vehicle inside temperature sensor, a vehicle inside humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle inside temperature information, vehicle inside humidity information, and steering wheel rotation angle information.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to detect and acquire biometric information of the occupant. The biometric information may include fingerprint information, iris-scan information, retina-scan information, hand geometry information, facial recognition information, and voice recognition information. The biometric information sensing unit may include a sensor to detect biometric information of the occupant. Here, the monitoring unit 725 and the microphone 723 may operate as sensors. The biometric information sensing unit may acquire hand geometry information and facial recognition information via the monitoring unit 725.

The output unit 740 is configured to output information processed in the controller 770. The output unit 740 may include the display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 741 may include a touch sensor which senses a touch to the display unit 741 so as to receive a control command in a touch manner.

When a touch is input to the display unit 741 as described above, the touch sensor may detect the touch and the controller 770 may generate a control command corresponding to the touch. Content input in a touch manner may be characters or numbers, or may be, for example, instructions in various modes or menu items that may be designated.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. Hereinafter, a touch or a touch input may generally refer to various types of touches mentioned above.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700.

For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770.

In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. Thus, the steering drive unit 752 may perform electronic control for a steering apparatus inside the vehicle 700.

The brake drive unit 753 may perform electronic control of a brake apparatus (not illustrated) inside the vehicle 700. For example, the brake drive unit 753 may reduce the speed of the vehicle 700 by controlling the operation of brakes located at wheels. In another example, the brake drive unit 753 may adjust the direction of travel of the vehicle 700 leftward or rightward by differentiating the operation of respective brakes located at left and right wheels.

The lamp drive unit 754 may turn at least one lamp arranged inside and outside the vehicle 700 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 700. For example, when the inside temperature of the vehicle 700 is high, the air conditioner drive unit 755 may operate the air conditioner to supply cold air to the inside of the vehicle 700.

The window drive unit 756 may perform the electronic control of a window apparatus inside the vehicle 700. For example, the window drive unit 756 may control the opening or closing of left and right windows of the vehicle 700.

The airbag drive unit 757 may perform the electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control the opening or closing of a sunroof.

The suspension drive unit 759 may perform electronic control on a suspension apparatus (not shown). For example, when a road surface has a curve, the suspension drive unit 759 may control the suspension apparatus to reduce vibrations of a vehicle.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 700 such as, for example programs for the processing or control of the controller 770.

The interface unit 780 may serve as a passage for various kinds of external devices that are connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 700. The controller 770 may be referred to as an Electronic Control Unit (ECU).

The controller 770 may execute a function corresponding to an execution signal delivered from the control device 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The controller 770 may play the role of the processor 170 described above. That is, the processor 170 of the control device 100 may directly set in the controller 770 of the vehicle. In this embodiment, the control device 100 may be understood to designate a combination of some components of the vehicle.

Further, the controller 770 may control components to transmit information requested by the processor 170.

The power source unit 790 may supply power required to operate the respective components under the control of the controller 770. In particular, the power source unit 790 may receive power from, for example, a battery (not illustrated) inside the vehicle 700.

The AVN apparatus 400 may exchange data with the controller 770. The controller 770 may receive navigation information from the AVN apparatus 400 or a separate navigation apparatus (not illustrated). Here, the navigation information may include set destination information, destination based routing information, and map information or vehicle location information related to vehicle traveling.

Figure 3:
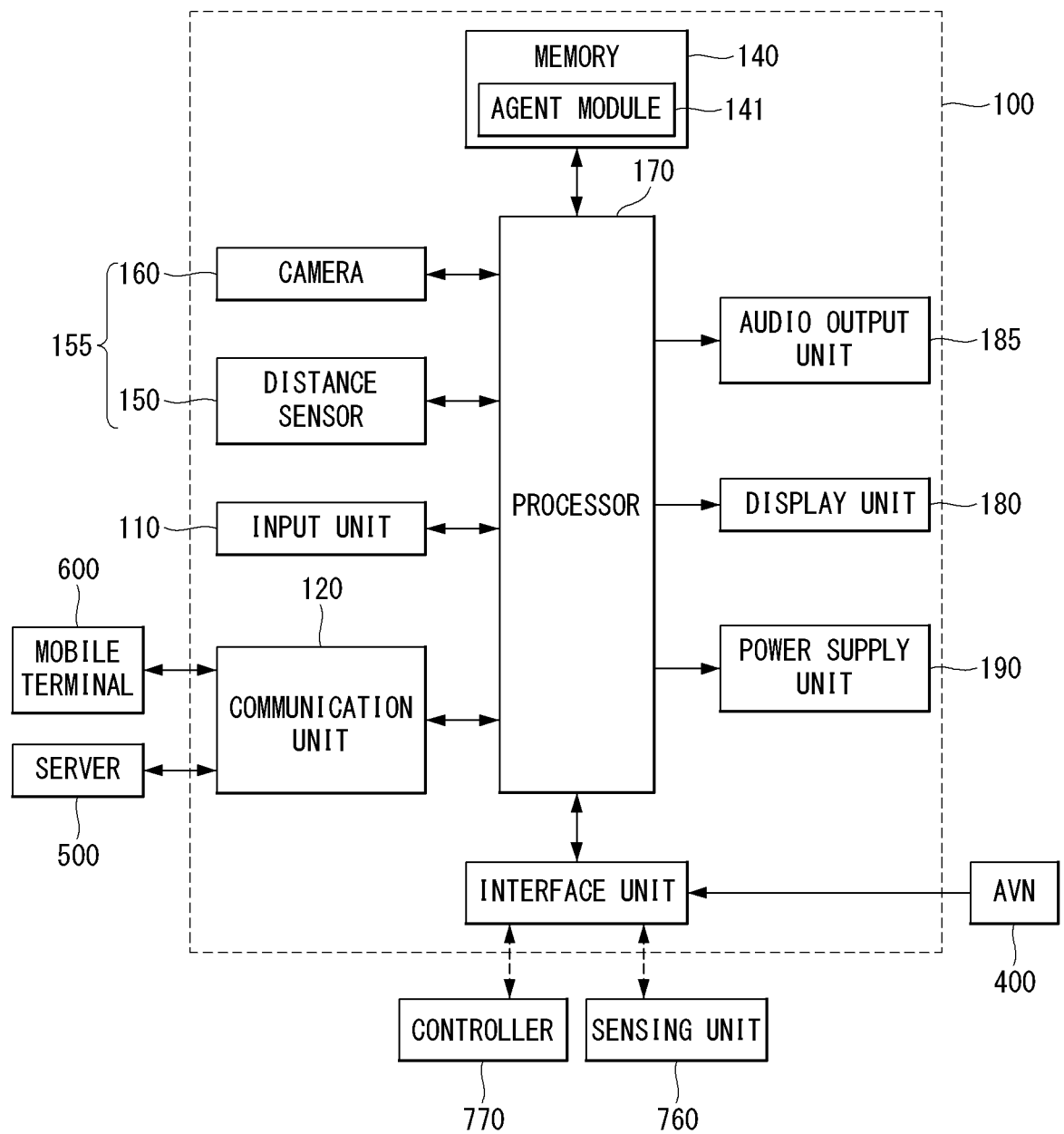
FIG. 3 shows a block diagram of a control device according to an embodiment of the present invention.
Figure 4:
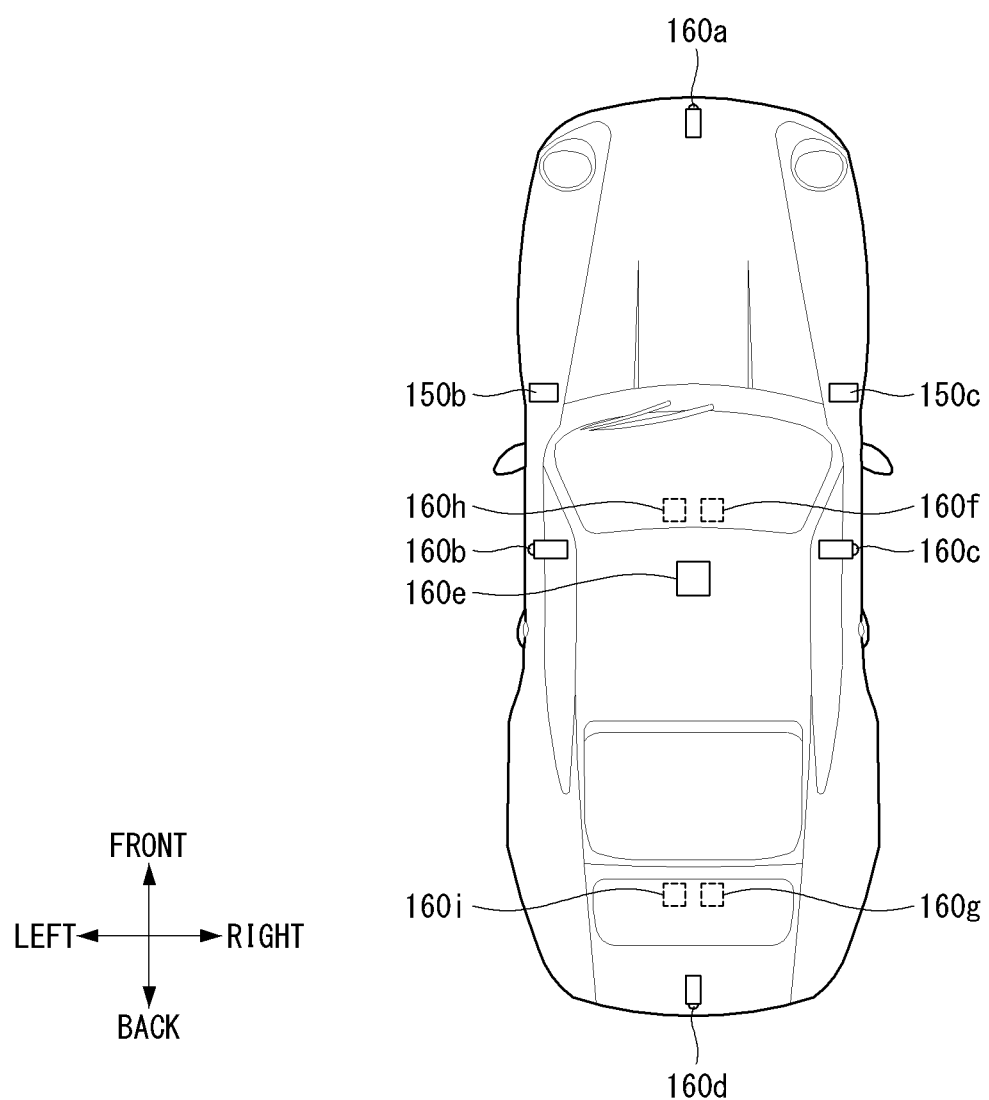
FIG. 4 shows a plan view of a vehicle including a control device according to an embodiment of the present invention.

Referring to FIG. 3, the vehicle control device 100 may include an input unit 110, a communication unit 120, an interface 130, a memory 140, a sensor unit 155, a monitoring unit 165, a processor 170, a display unit 180, an audio output unit 185, and a power supply unit 190. However, the units of the vehicle control device 100 of FIG. 3 are unnecessary to realize the vehicle control device 100. Thus, the vehicle control device 100 described in this specification may include additional components in addition to the above-described components, or a portion of the above-described components may be omitted.

Each component will now be described in detail. The vehicle control device 100 may include the input unit 110 for receiving user input.

For example, a user may input setting/execution of the vehicle surrounding image display function and the self-driving function, which are provided by the vehicle control device 100, or may input execution of power on/off of the vehicle control device 100 through the input unit 110.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the vehicle control device 100 may include the communication unit 120 for communicating with another vehicle 510, a terminal 600 and a server 500.

The communication unit 120 may receive changed information in outer appearance of the vehicle or vehicle surrounding information from an object mounted on the outside of the vehicle or a structure for mounting the object. Also, the vehicle control device 100 may display the vehicle surrounding image on the basis of the changed information in outer appearance of the vehicle and the vehicle surrounding information and provide the self-driving function.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the vehicle control device 100 may pair with each other automatically or by executing a user application.

The communication unit 120 may exchange data with the other vehicle 510, the mobile terminal 600 or the server 500 in a wireless manner.

In detail, the communication unit 120 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the vehicle control device 100 may pair with the mobile terminal located inside the vehicle using a short-range communication method and wirelessly exchange data with the other vehicle 510 or the server 500 using a long-distance wireless communication module of the mobile terminal.

Next, the vehicle control device 100 may include the interface 130 for receiving data of the vehicle and transmitting a signal processed or generated by the processor 170.

In detail, the vehicle control device 100 may receive at least one of driving information of another vehicle, navigation information and sensor information via the interface 130.

In addition, the vehicle control device 100 may transmit a control signal for executing a driving assistance function or information generated by the vehicle control device 100 to the controller 770 of the vehicle via the interface 130.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor on the basis of rotation of the steering wheel, a vehicle inside temperature sensor, a vehicle inside humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the vehicle control device 100, such as a program for processing or control of the controller 170.

In addition, the memory 140 may store data and commands for operation of the vehicle control device 100 and a plurality of application programs or applications executed in the vehicle control device 100. At least some of such application programs may be downloaded from an external server through wireless communication. At least one of such application programs may be installed in the vehicle control device 100 upon release, in order to provide the basic function (e.g., the driver assistance information guide function) of the vehicle control device 100.

Such application programs may be stored in the memory 140 and may be executed to perform operation (or function) of the vehicle control device 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia vehicled, a vehicled type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle control device 100 may operate in association with a network storage for performing a storage function of the memory 140 over the Internet.

Next, the monitoring unit 165 may acquire information on the internal state of the vehicle.

The information detected by the monitoring unit may include at least one of facial recognition information, fingerprint information, iris-scan information, retina-scan information, hand geometry information, and voice recognition information. The monitoring unit may include other sensors for sensing such biometric recognition information.

Next, the vehicle control device 100 may further include the sensor unit 155 for sensing objects located in the vicinity of the vehicle. The vehicle control device 100 may include the sensor unit 155 for sensing peripheral objects and may receive the sensor information obtained by the sensor unit 155 of the vehicle via the interface 130. The acquired sensor information may be included in the information on the vehicle surrounding information.

The sensor unit 155 may include at least one of a distance sensor 150 for sensing the position of an object located in the vicinity of the vehicle and a camera 160 for capturing the image of the vicinity of the vehicle.

First, the distance sensor 150 may accurately detect the position of the object located in the vicinity of the vehicle, a distance between the object and the vehicle, a movement direction of the object, etc. The distance sensor 150 may continuously measure the position of the sensed object to accurately detect change in positional relationship with the vehicle.

The distance sensor 150 may detect the object located in at least one of the front, rear, left and right areas of the vehicle. The distance sensor 150 may be provided at various positions of the vehicle.

In detail, referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170.

In detail, the vehicle control device 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information.

In detail, the processor 170 may detect the object from the captured image via image processing, track the object, measure the distance from the object, and check the object to analyze the object, thereby generating image information.

The camera 160 may be provided at various positions.

In detail, the camera 160 may include an internal camera 160f for capturing an image of the front side of the vehicle within the vehicle and acquiring a front image.

Referring to FIG. 3, a plurality of cameras 160 may be provided at least one of the front, rear, right and left and ceiling of the vehicle.

In detail, the left camera 160b may be provided inside a case surrounding a left side view mirror. Alternatively, the left camera 160b may be provided outside the case surrounding the left side view mirror. Alternatively, the left camera 160b may be provided in one of a left front door, a left rear door or an outer area of a left fender.

The right camera 160c may be provided inside a case surrounding a right side view mirror. Alternatively, the right camera 160c may be provided outside the case surrounding the right side view mirror. Alternatively, the right camera 160c may be provided in one of a right front door, a right rear door or an outer area of a right fender.

In addition, the rear camera 160d may be provided in the vicinity of a rear license plate or a trunk switch. The front camera 160a may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160e may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, for example, the camera 160 may be a stereo camera for capturing an image and, at the same time, measuring a distance from an object.

The sensor unit 155 may be a stereo camera including the distance sensor 150 and the camera 160. That is, the stereo camera may acquire an image and, at the same time, detect a positional relationship with the object.

Figure 5:
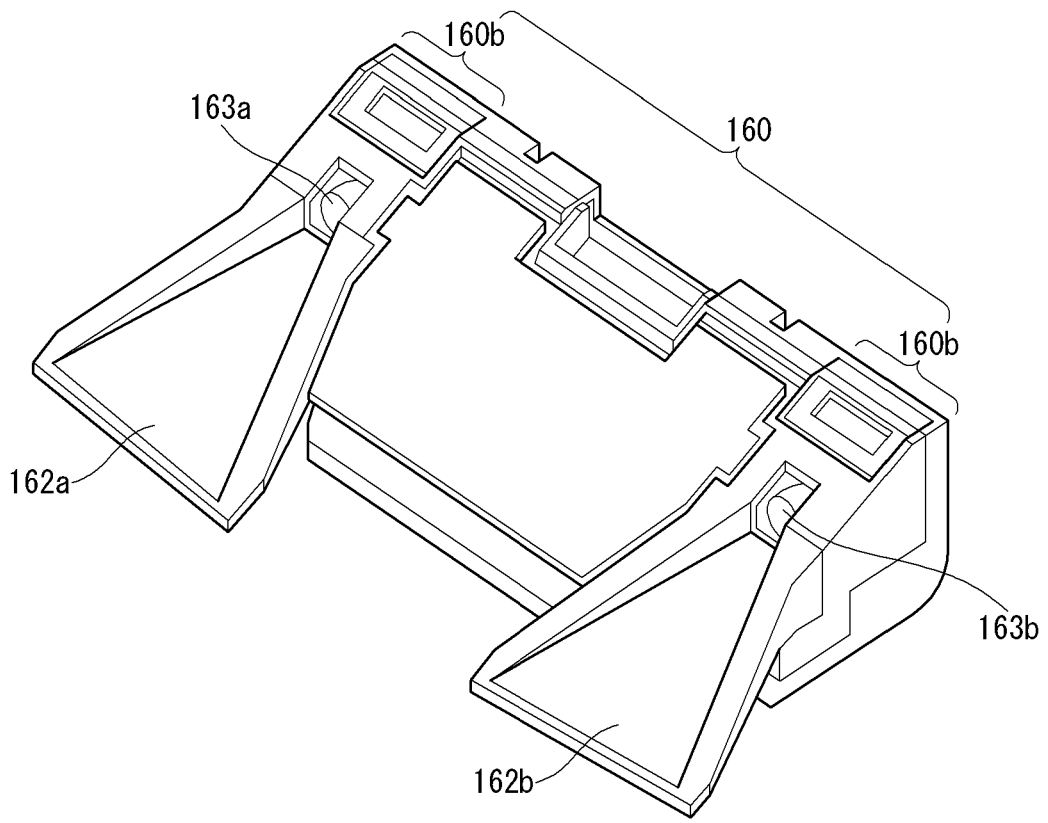
FIG. 5 shows an example of a camera according to an embodiment of the present invention.
Figure 6:
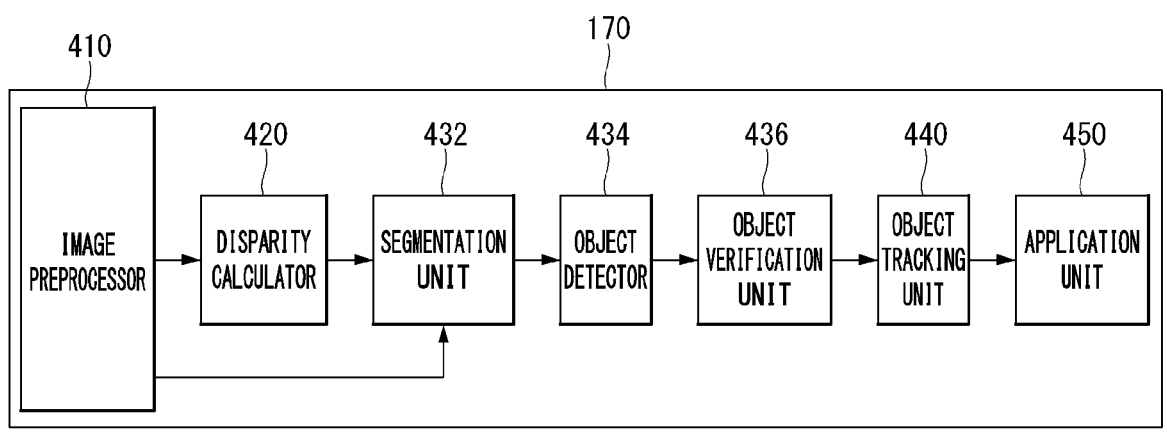
FIGS. 6 and 7 are diagrams for explaining an example of a method for generating image information based on an image photographed by a camera according to an embodiment of the present invention.
Figure 7:
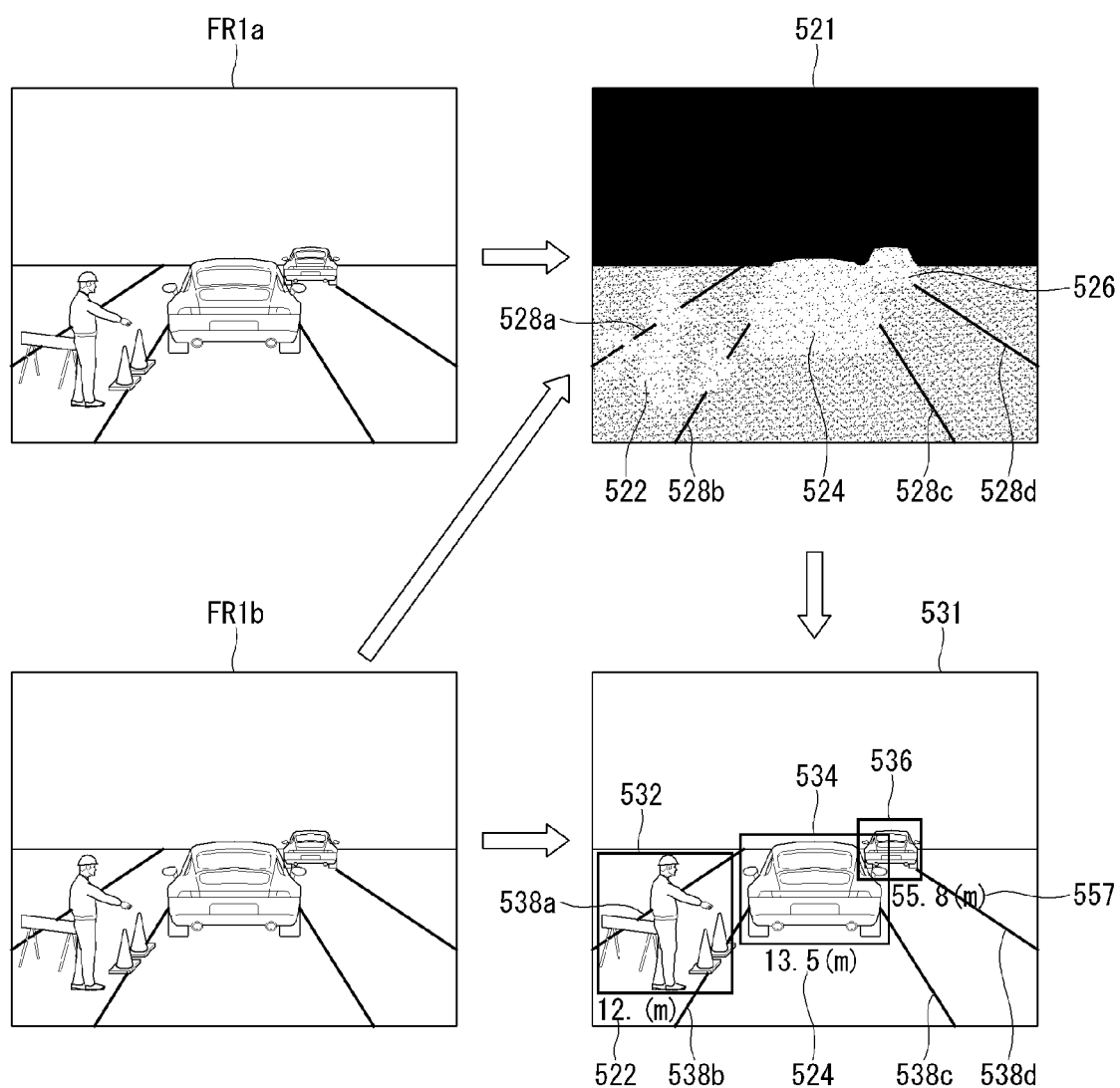
Figure 8:
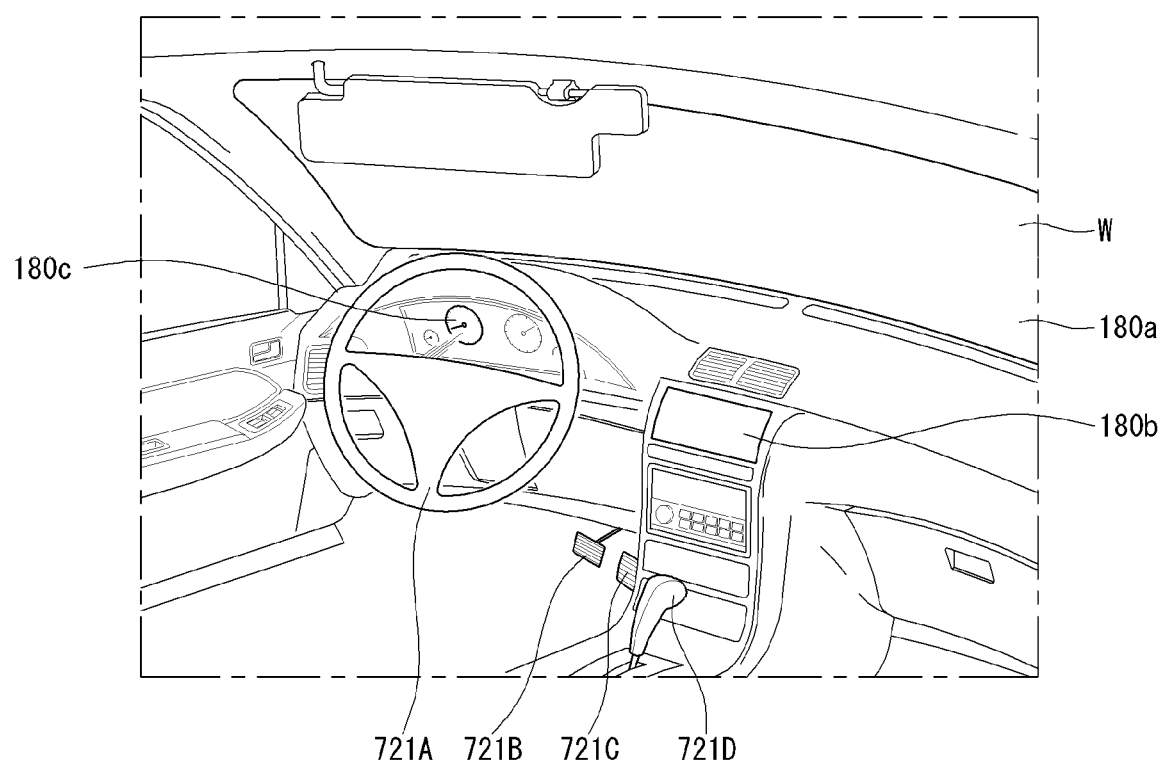
FIGS. 8 and 9 are diagrams showing an interior of a vehicle including a vehicle driving assistance device according to an embodiment of the present invention.

Referring to FIGS. 5, 6, and 7, the stereo camera 160 and a method by which the processor 170 detects image information using the stereo camera will be described in more detail.

Referring to FIG. 5, the stereo camera 160 may include a first camera 160a having a first lens 163a and a second camera 160b having a second lens 163b.

Meanwhile, the vehicle driving assistance apparatus may further includes a first light shield 162a and a second light shield 162b for shielding light incident on the first lens 163a and the second lens 163b, respectively.

This vehicle driving assistance apparatus may obtain a stereo image of the surroundings of the vehicle from the first and second cameras 160a and 160b, perform disparity detection on the basis of the stereo image, detect an object from at least one stereo image on the basis of disparity information, and continue to track movement of the object after the object is detected.

Referring to FIG. 6, an example of an internal block diagram of the processor 170 is illustrated, and the processor 170 in the control device 100 may include an image preprocessor unit 410, a disparity calculator 420, an object detector 434, an object tracking unit 440, and an application unit 450. In FIG. 5 and the following description, it is described that an image is processed in the order of the image preprocessor unit 410, the disparity calculator 420, the object detector 434, the object tracking unit 440, and the application unit 450, but aspects of the present invention are not limited thereto.

The image preprocessor 410 may receive an image from the camera 160 and performs preprocessing on the received image.

Specifically, the image preprocessor 410 may perform noise reduction, rectification, calibration, color enhancement, color space conversion (CSC), interpolation, camera gain control of the camera 160 in regard to an image. Accordingly, it is possible to acquire an image clearer than a stereo image photographed by the camera 160.

The disparity calculator 420 may receive an image signal-processed in the image preprocessor 410, perform stereo matching on received images, and acquire a disparity map as a result of the stereo matching. That is, it is possible to acquire disparity information regarding stereo images of an area in front of a vehicle.

Here, the stereo matching may be performed in a pixel unit or a predetermined block unit of stereo images. Meanwhile, the disparity map may refer to a map that represents stereo images, that is, binocular parallax information of left and right images, as numeric values.

A segmentation unit 432 may perform segment and clustering regarding at least one image, based on disparity information received from the disparity calculator 420.

Specifically, the segmentation unit 432 may segment at least one stereo image into a background and a foreground, based on disparity information.

For example, an area having disparity information equal to or smaller than a predetermined value in a disparity map may be calculated as a background and excluded. Accordingly, the foreground may appear to be segmented. In another example, an area having disparity information equal to or greater than a predetermined value in a disparity map may be calculated as a foreground and extracted. Accordingly, the foreground may be segmented.

As such, a foreground and a background are segmented based on disparity information extracted based on a stereo images, and thus, if an object is detected later on, the speed for signal processing, a computation amount for signal processing, and the like may be reduced.

Next, the object detector 434 may detect an object on the basis of image segmentation by the segmentation unit 432.

That is, the object detector 434 may detect an object from at least one image, based on disparity information.

Specifically, the object detector 434 may detect an object from at least one image. For example, an object may be detected from a foreground segmented through image segmentation.

Next, the object verification unit 436 may classify and verify the segmented object.

To this end, the object verification unit 436 may employ a verification scheme using a neural network, a Support Vector Machine (SVM) scheme, a verification scheme by AdaBoost based on Haar-like features, a Histogram of Oriented Gradients (HOG) scheme, or the like.

Meanwhile, the object verification unit 436 may verify an object by comparing a detected object with objects stored in the memory 140.

For example, the object verification unit 436 may verify a nearby vehicle, a lane, a road surface, a traffic sign, a dangerous area, a tunnel, etc. in the vicinity of the vehicle.

The object tracking unit 440 may track a verified object. For example, the object tracking unit may verify an object in stereo images acquired sequentially, calculate a motion or a motion vector of the verified object, and track movement and the like of the corresponding object based on the calculated motion or motion vector. Accordingly, it is possible to track a nearby vehicle, a lane, a road surface, a traffic sign, a dangerous area, a tunnel, etc. in the vicinity of the vehicle.

Next, the application unit 450 may calculate a level of danger of the vehicle based on various objects, such as a nearby vehicle, a lane, a road surface, a traffic sign, etc., which are located in the vicinity of the vehicle. In addition, it is possible to calculate a possibility to collide with a preceding vehicle, a possibility of slipping of the vehicle, etc.

In addition, the application unit 450 may output a message and the like as vehicle driving assistant information to inform a user of the level of danger, the possibility of collision, the possibility of slipping, and the like. Alternatively, the application unit may generate a control signal for controlling position or travel of the vehicle as vehicle control information.

Meanwhile, the image preprocessor 410, the disparity calculator 420, the segmentation unit 432, the object detector 434, the object verification unit 436, the object tracking unit 440, and the application unit 450 may be elements of an image processor in the processor 170.

Meanwhile, in some embodiments, the processor 170 may include only some of the image preprocessor 410, the disparity calculator 420, the segmentation unit 432, the object detector 434, the object verification unit 436, the object tracking unit 440, and the application unit 450. For example, if the camera 160 is implemented as a mono camera 160 or an around-view camera 160, the disparity calculator 420 may be excluded. In addition, in some embodiments, the segmentation unit 432 may be excluded.

Referring to FIG. 7, the camera 160 may acquire stereo images during a first frame period.

The disparity calculator 420 in the processor 170 may receive stereo images FR1a and FR1b processed by the image preprocessor 410, and acquire a disparity map 520 by performing stereo matching on the received stereo images FR1a and FR1b.

The disparity map 520 indicates the levels of binocular parallax between the stereo images FR1a and FR1b, and, as a disparity level increases, a distance from a vehicle may decrease, and, as the disparity level decreases, the distance from the vehicle may increase.

When such a disparity map is displayed, luminance may increase as the disparity level increases, and luminance may decrease as the disparity level decreases.

In the drawing, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520.

The segmentation unit 432, the object detector 434 and the object verification unit 436 perform segmentation, object detection and object verification with respect to at least one of the stereo images FR1a and FR1b based on the disparity map 520.

In the drawing, object detection and verification are performed with respect to the second stereo image FR1b using the disparity map 520.

That is, object detection and verification are performed with respect to the first to fourth lanes 538a, 538b, 538c and 538d, the construction area 532, the first preceding vehicle 534 and the second preceding vehicle 536 of the image 530.

With image processing, the control device 100 may acquire various vehicle surrounding information, such as peripheral objects or the positions of the peripheral objects, using the sensor unit 155, as sensor information.

Next, the control device 100 may further include a display unit 180 which displays a graphic image. The display unit 180 may include a plurality of displays. The display unit 180 may include a first display unit 180a for projecting and displaying a graphic image onto and on a vehicle windshield W. That is, the first display unit 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display unit 180b and a third display unit 180c separately provided inside the vehicle to display an image of the driver assistance function.

In more detail, the second display unit 180b may be a display or a center information display (CID) of a vehicle navigation apparatus. The third display unit 180c may be a cluster.

The second display unit 180b and the third display unit 180c may include at least one selected from among a Liquid Crystal Display (LCD), a Thin Film Transistor LCD (TFT LCD), an Organic Light Emitting Diode (OLED), a flexible display, a 3D display, and an e-ink display.

The second display unit 180b and the third display unit 180c may be combined with a gesture input unit to achieve a touchscreen.

Next, the audio output unit 185 may audibly output a message describing a function of the control device 100 and checking whether to perform the function. That is, the control device 100 may provide visual explanation of the function of the control device 100 via visual display of the display unit 180 and audio output of the audio output unit 185.

Next, the haptic output unit may output an alarm for the driver assistance function in a haptic manner. For example, the control device 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration, and left or right vibration may be output according to the left and right sides of the steering apparatus to enable directional haptic output.

In addition, the power supply 190 may receive external power and internal power and supply power necessary for operation of the components under control of the processor 170.

The control device 100 may include the processor 170 for controlling overall operation of the units of the control device 100.

The processor 170 may take over the ole of the controller 770. That is, the processor 170 of the control device 100 may be set directly by the controller 770 of the vehicle. In such an embodiment, the control device3 100 may be interpreted as indicating a combination of some components of the vehicle. Alternatively, the processor 170 may control components to transmit information requested by the controller 770.

Further, the processor 170 may operate a combination of at least two of the components included in the control device 100, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions.

The processor 170 may control overall operation of the control device 100 in addition to operation related to the application programs stored in the memory 140. The processor 170 may process signals, data, information, etc. via the above-described components or execute the application programs stored in the memory 140 to provide appropriate information or functions to the user.

Figure 9:
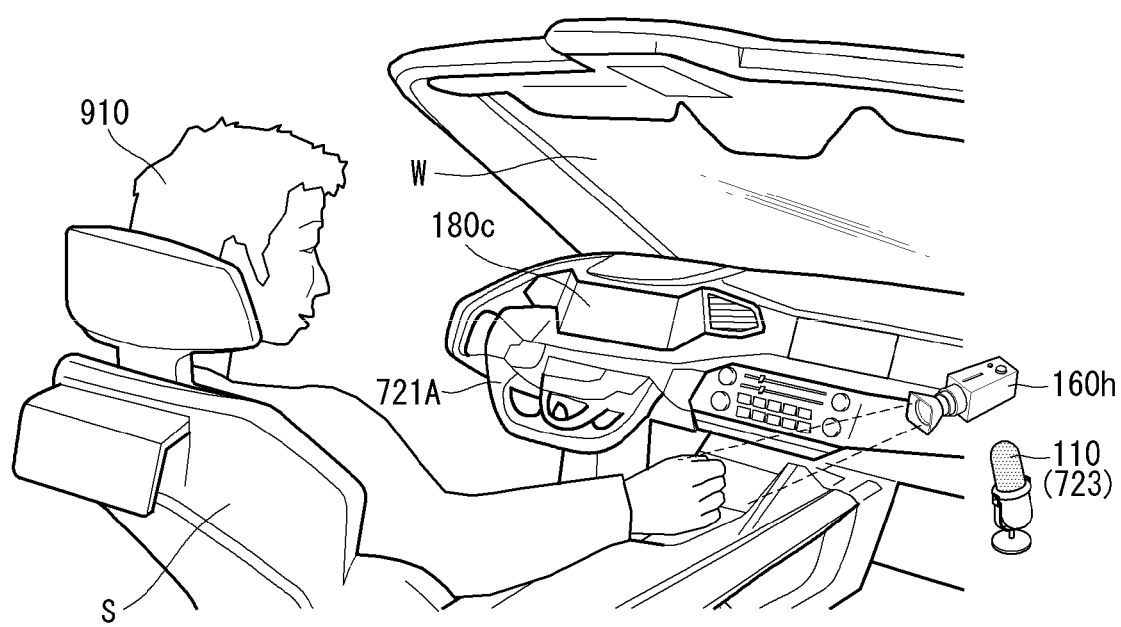

Referring to FIG. 9, a camera 160h may photograph the interior of a vehicle 700 and an occupant 900 present in the vehicle 700. Microphones 110 and 723 may receive a sound or voice generated inside the vehicle 700. The microphones 110 and 723 may be referred to as voice input units 110 and 723. The processor 170 may sense the interior of the vehicle 700 through the camera 160h. The processor 170 may sense a motion of the occupant 900 and a state of the occupant 900 through the camera 160h. The processor 170 may sense a voice of the occupant 900 through the microphone 160h. The processor 170 may be referred to as a controller 170.

An agent module 141 may be a program stored in the memory 140. The agent module 141 may be implemented by the processor 170. Alternatively, the agent module 141 may be a part of the processor 170 or may be the processor 170 itself. The processor 170 may receive speaking of the occupant 900 through the microphone 110. The speaking of the occupant 900 may include a word, a phrase, and a sentence. The agent module 141 may generate a response to the speaking of the occupant 900. The processor 170 may output the response, generated by the agent module 141, in a form of conversation. The response from the processor 170 may be output as a sound through the audio output unit 185. The processor 170 may respond in a form of answering the speaking of the occupant 900. Alternatively, the processor 170 may respond in a form of displaying conversation, an image, a text, etc. on the display unit 180.

Figure 10:
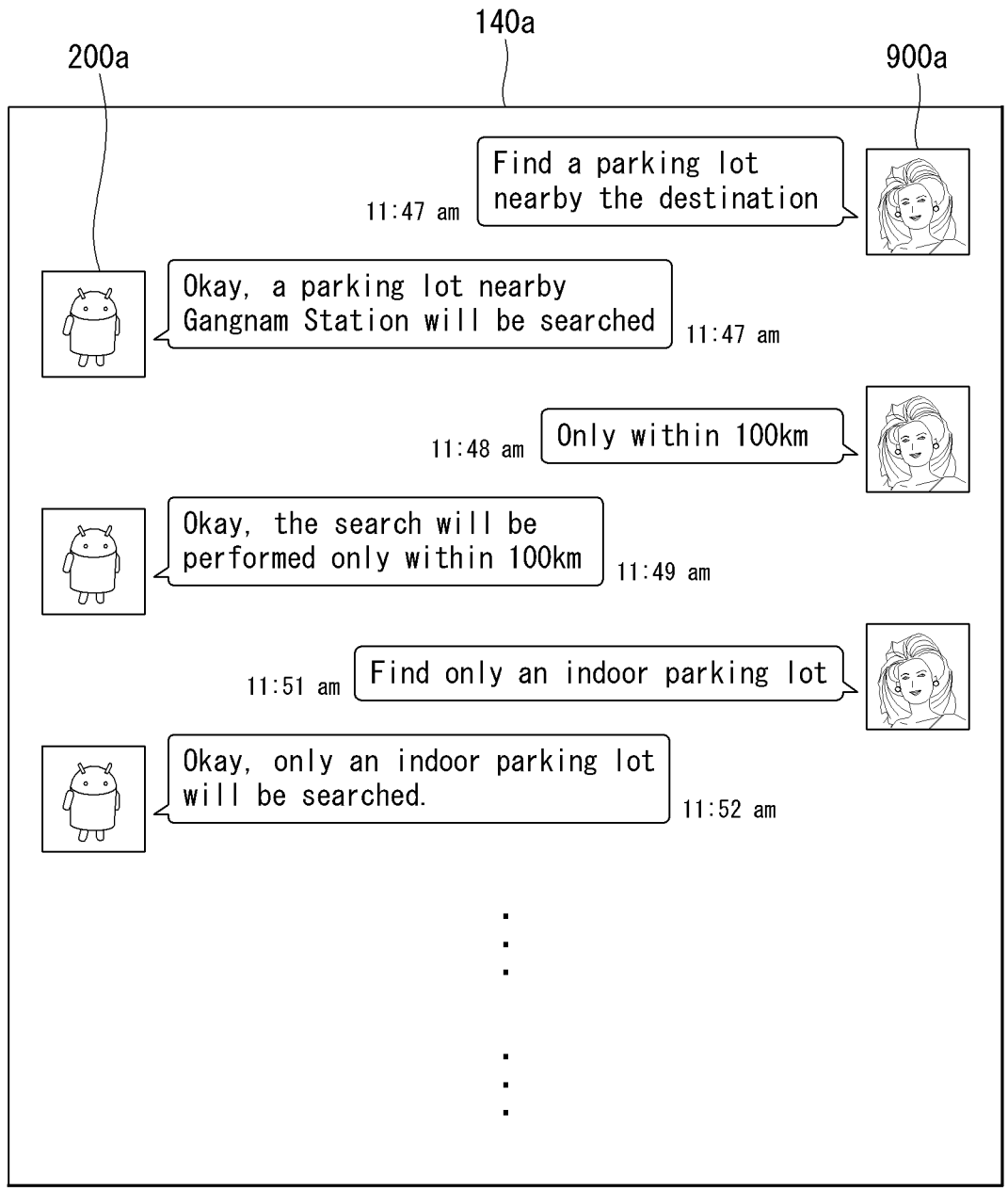
FIGS. 10 to 25 are diagrams showing embodiments of a control device according to embodiments of the present invention.

Referring to FIG. 10, the processor 170 may generate a dialogue 140a. The dialogue 140a may be stored speaking of the occupant 900 and a stored response of the processor 170 to the speaking of the occupant 900. The dialogue 140a may store the speaking of the occupant 900 and the response of the processor 170 in a text form. The dialogue 140a may store the speaking of the occupant 900 and the response of the processor 170 in chronological order. The dialogue 140a may store a content related to the speaking of the occupant or the response of the processor 170. The related content may be time information, image information, video information, travel information, vehicle location information, a destination, a start location, a waypoint, etc. The processor 170 may display a dialogue and a dialogue related content through the display unit 180.

A continuity between the speaking of the occupant 900 and the response of the processor 170 may be referred to as conversation or communication. The dialogue 140a may be stored conversation or communication.

The response of the processor 170 may be generated by the agent module 141 on its own. Alternatively, the processor 170 may transmit a speaking content of the occupant 900 to the outside through the communication unit 120 or may output a content received from the outside as a response to the speaking content of the occupant 900. For example, the processor 170 may transmit the speaking content of the occupant 900 to the server 500 through the communication unit 120. The server 500 may generate a content responsive to the speaking content of the occupant 900, and transmit the content to the processor 170. The processor 170 may output the content received from the server as a response to the speaking content of the occupant 900. Hereinafter, the responsive content of the processor 170 may include both a responsive content generated by the agent module 141 on its own and a responsive content received from the outside.

The travel information may include a travel mode of the vehicle 700, a state of the vehicle 700, a travel state, a direction of travel of the vehicle 700, a situation in the vicinity of the vehicle 700, a situation inside the vehicle 700, etc.

The travel mode may be differentiated depending on whether the traveling of the vehicle 700 is manually performed by a driver, whether the traveling of the vehicle 700 is automatically performed by the processor 170, or whether the traveling of the vehicle 700 is partially manually performed by the driver and partially automatically performed by the processor 170.

The processor 170 may display an image 140a of a dialogue through the display unit 180. The processor 170 may display a speaking content 900a of the occupant 900 and a response content 200a of the processor 170.

The processor 170 may activate or call the agent module 141 in accordance with a predetermined input. Alternatively, the processor may activate a function related to the dialogue. The predetermined input may include a voice input of speaking a specific content, a touch input, or a button input. For example, the predetermined input may be speaking "Hi, LG" of the occupant 900. The processor 170 may sense the predetermined input trough the microphone 110 or the camera 160h. When a predetermined period of time passes without speaking of the occupant 900, the processor 170 may deactivate the agent module 141.

When the predetermined input is received, the processor 170 may activate the microphone 110. When the predetermined input is received, the processor 170 may keep the microphone 110 activate for a predetermined period of time. When a predetermined period of time passes without speaking of the occupant 900, the processor 170 may deactivate the microphone 110.

The processor 170 may temporarily store the generated dialogue in the memory 140 for a preset period of time. The temporarily storage may mean that the dialogue is stored in the memory 140 and maintaining the temporary stored state or deleting the stored content depends on a specific condition. For example, if a specific condition is satisfied, a dialogue may continue to be stored in the memory 140. In another example, if the specific condition is satisfied, the dialogue may be deleted. In yet another example, the temporary storage may mean that the dialogue is not stored permanently. The processor 170 may repeatedly call, load, or perform loading of a dialogue temporally-stored or stored in the memory 140. For example, a generated dialogue may be stored in the memory 140 for a predetermined period of time. Here, the predetermined period of time for storing the dialogue may be longer than a period of time until the microphone 110 is activated after a predetermined input is received.

Figure 11:
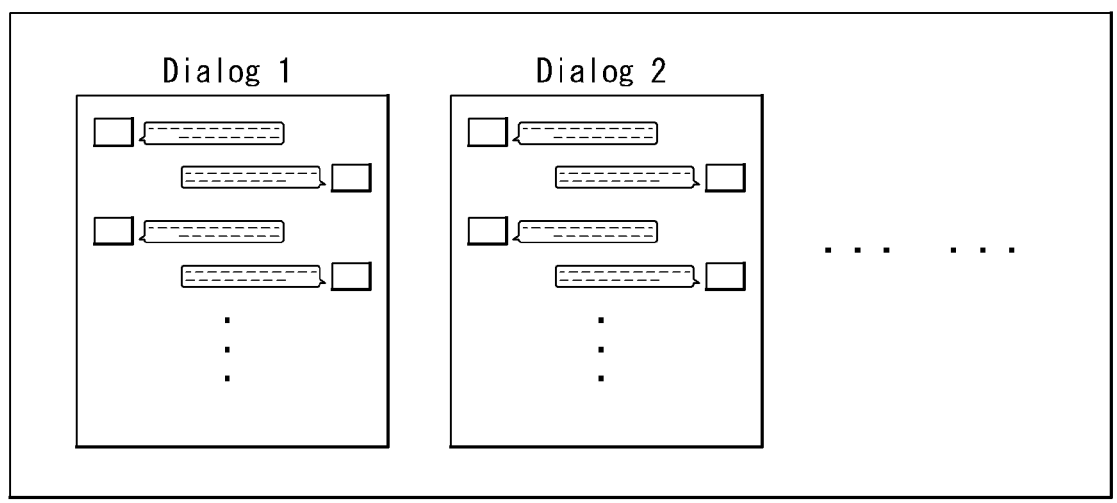

Referring to FIG. 11, the processor 170 may receive speaking content of the occupant 900. The processor 170 may select a dialogue matching the speaking content of the occupant 900 from among a plurality of pre-stored dialogues. The processor 170 may re-activate the selected dialogue. The memory 140 may store a plurality of dialogues. The processor may selectively and repeatedly load the plurality of dialogues stored in the memory 140.

Figure 12:
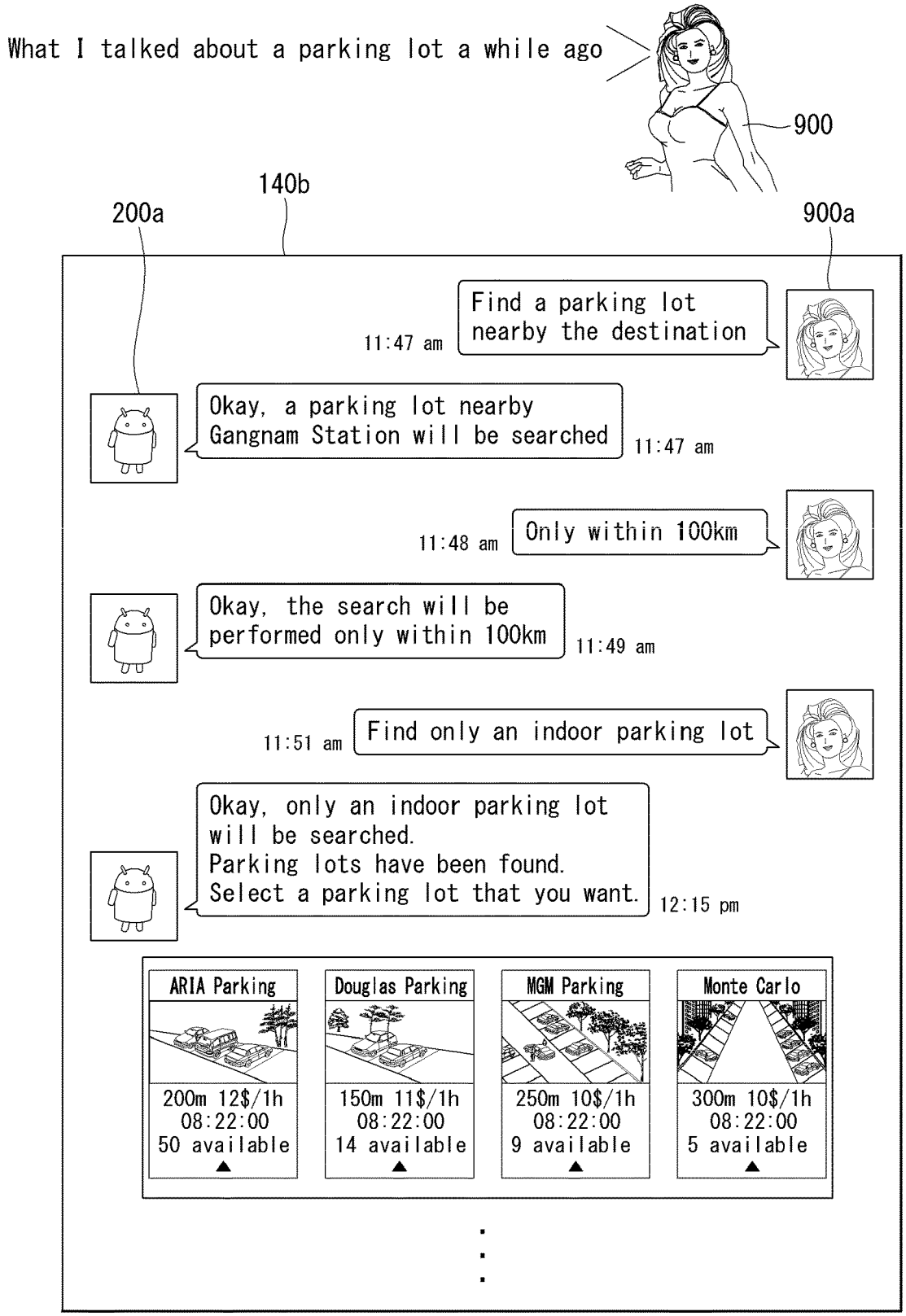

Referring to FIG. 12, a dialogue may be temporarily interrupted by an event. The temporary interruption may mean that a speaking of the occupant 900 has not been received for a preset period of time during conversation between the occupant 900 and the processor 170. Even though the dialogue is temporarily interrupted, if the interrupted period of time is shorter than the preset period of time, the dialogue may be maintained in a temporary stored state.

For example, if the occupant 900 transmits and receives a phone call during conversation between the occupant 900 and the processor 170, the dialogue may be temporarily interrupted. The processor 170 may temporarily interrupt the dialogue and control the display unit 180 to display a call event.

In another example, the processor 170 may temporarily interrupt the dialogue and automatically respond to a call for the occupant 900.

In yet another example, while a dialogue is in progress, the processor 170 may output an image to receive a selection from the user 900 through the display unit 180. For instance, the processor 170 may display a list of parking lots so as to allow the occupant 900 to select a parking lot. In order to select a parking lot, the occupant 900 may view the display unit 180, and hence speaking of the occupant 900 may be interrupted. In this case, the dialogue may be temporarily interrupted. Through the camera 160h, the processor 170 may sense that the occupant 900 is gazing at the display unit 180. For instance, if a call is made while the dialogue is in progress, the processor 170 may display an image to receive a selection as to whether to receive the call or not.

When the dialogue is temporarily interrupted, the processor 170 may variably adjust a period of time for storing the dialogue. For example, the processor 170 may extend the preset period of time by a period of time for which the dialogue is temporarily interrupted.

After the dialogue is temporarily interrupted, the processor 170 may load the dialogue stored in the memory 140 in response to speaking of the occupant 900. Based on speaking content of the occupant 900, the processor 170 may load a dialogue including content directly or indirectly related to the speaking content of the occupant 900. The processor 170 may display the loaded dialogue as an image 140b through the display unit 180.

Figure 13:
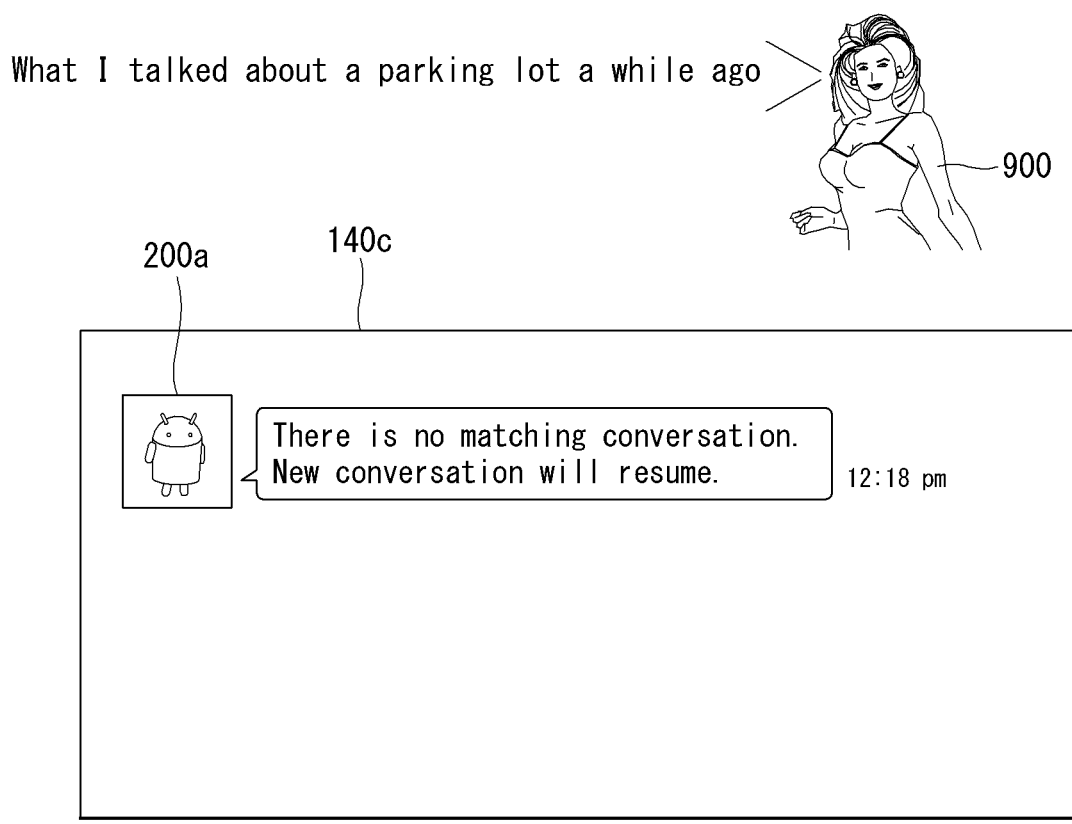

Referring to FIG. 13, in response to speaking of the occupant 900, the processor 170 may search for a dialogue stored in the memory 140. Based on speaking content of the occupant 900, the processor 170 may search whether a dialogue including content directly or indirectly related to the speaking content of the occupant 900 is stored in the memory 140. If a dialogue responsive to the speaking content of the occupant 900 does not exist in the memory 140, the processor 170 may generate a new dialogue.

The dialogue directly or indirectly related to the speaking content of the occupant 900 may be temporarily stored and then deleted upon elapse of a preset period of time, and the processor 170 may generate a new dialogue. The processor 170 may display as an image 140c through the display unit 180 to indicate that the new dialogue has been generated.

For example, the processor 170 may activate the agent module 141. The processor 170 may generate a first dialogue. The processor 170 may temporarily store the first dialogue for a preset period of time. The processor 170 may recognize a command input by the occupant 900 to call the first dialogue. The processor 170 may determine whether the first dialogue is called within the preset period of time or after the elapse of the preset period of time. If the first dialogue is called within the preset period of time, the processor may call the first dialogue. If the first dialogue is called after the elapse of the preset period of time, the processor 170 may generate a second dialogue.

In another example, the processor 170 may receive speaking content of the occupant 900. The processor 170 may determine whether a pre-stored dialogue contains information coinciding with the speaking content of the occupant 900. If a dialogue containing information coinciding with the speaking content of the occupant 900 exists, the processor 170 may load the dialogue. If no dialogue containing information coinciding with the speaking content of the occupant 900 exists, the processor 170 may generate a new dialogue.

In yet another example, the processor 170 may load a pre-stored dialogue. The processor 170 may receive speaking content of the occupant 900. The processor 170 may determine whether a loaded dialogue contains information coinciding with the speaking content of the occupant 900. If information coinciding with the speaking content of the occupant 900 exists in the loaded dialogue, the processor 170 may proceed with conversation with the loaded dialogue. If information coinciding with the speaking content of the occupant 900 does not exist in the loaded dialogue, the processor 170 may generate a new dialogue.

In yet another example, the processor 170 may generate a dialogue. The processor 170 may temporarily store the dialogue for a preset period of time. If there is a call from the occupant 900 within the preset period of time, the processor 170 may load the pre-stored dialogue. The processor 170 may sense occurrence of an event. If an event has occurred, the processor 170 may variably adjust the preset period of time. If an event has not occurred, the processor 170 may maintain the preset period of time.

In yet another example, the processor 170 may generate a dialogue. The processor 170 may temporarily store the dialogue. If there is a call from the occupant 900 within the preset period of time, the processor 170 may load the pre-stored dialogue. The processor 170 may display a content related to the called dialogue. The processor 170 may monitor a gaze of the occupant. The processor 170 may determine whether the occupant 900 is gazing at the content. If it is determined that the occupant 900 is gazing at the content, the processor 170 may extend the preset period of time. If it is determined that the occupant 900 is not gazing at the content, the processor 170 may maintain the preset period of time.

In yet another example, the processor 170 may generate a dialogue. The processor 170 may temporarily store the dialogue for a preset period of time. If there is a call from the occupant 900 within the preset period of time, the processor 170 may load the pre-stored dialogue. The processor 170 may display a content to receive an input of the occupant 900. The processor 170 may extend the preset period of time until the input of the occupant 900 is received.

Figure 14:
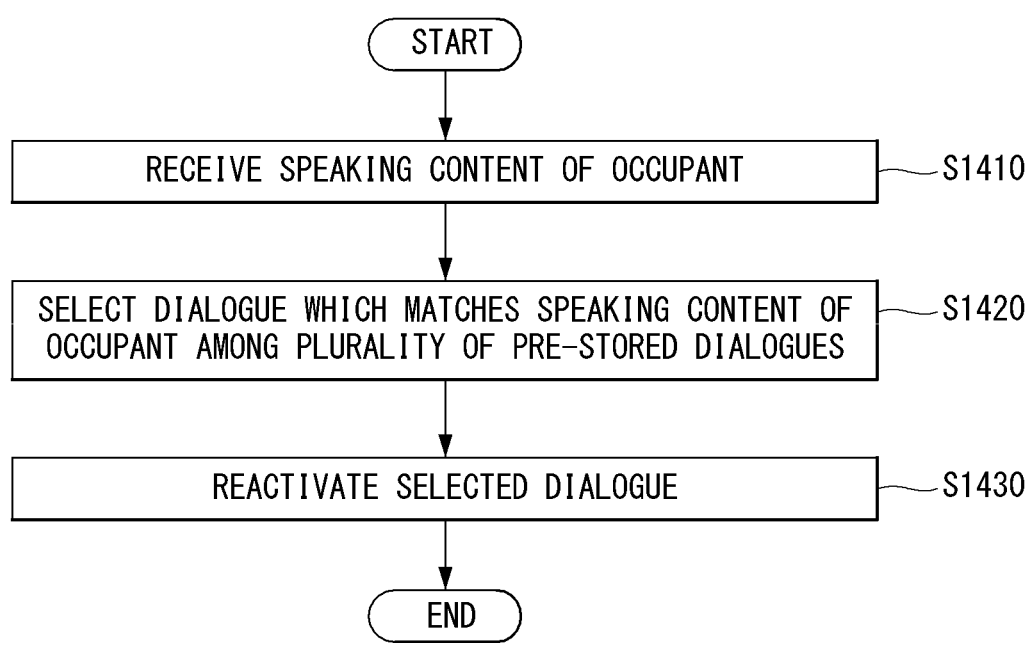

Referring to FIG. 14, the processor 170 may receive speaking content of the occupant 900 (S1410). The processor 170 may select a dialogue which matches the speaking content of the occupant 900 from among a plurality of pre-stored dialogues (S1420). The processor 170 may re-activate the selected dialogue (S1430).

Figure 15:
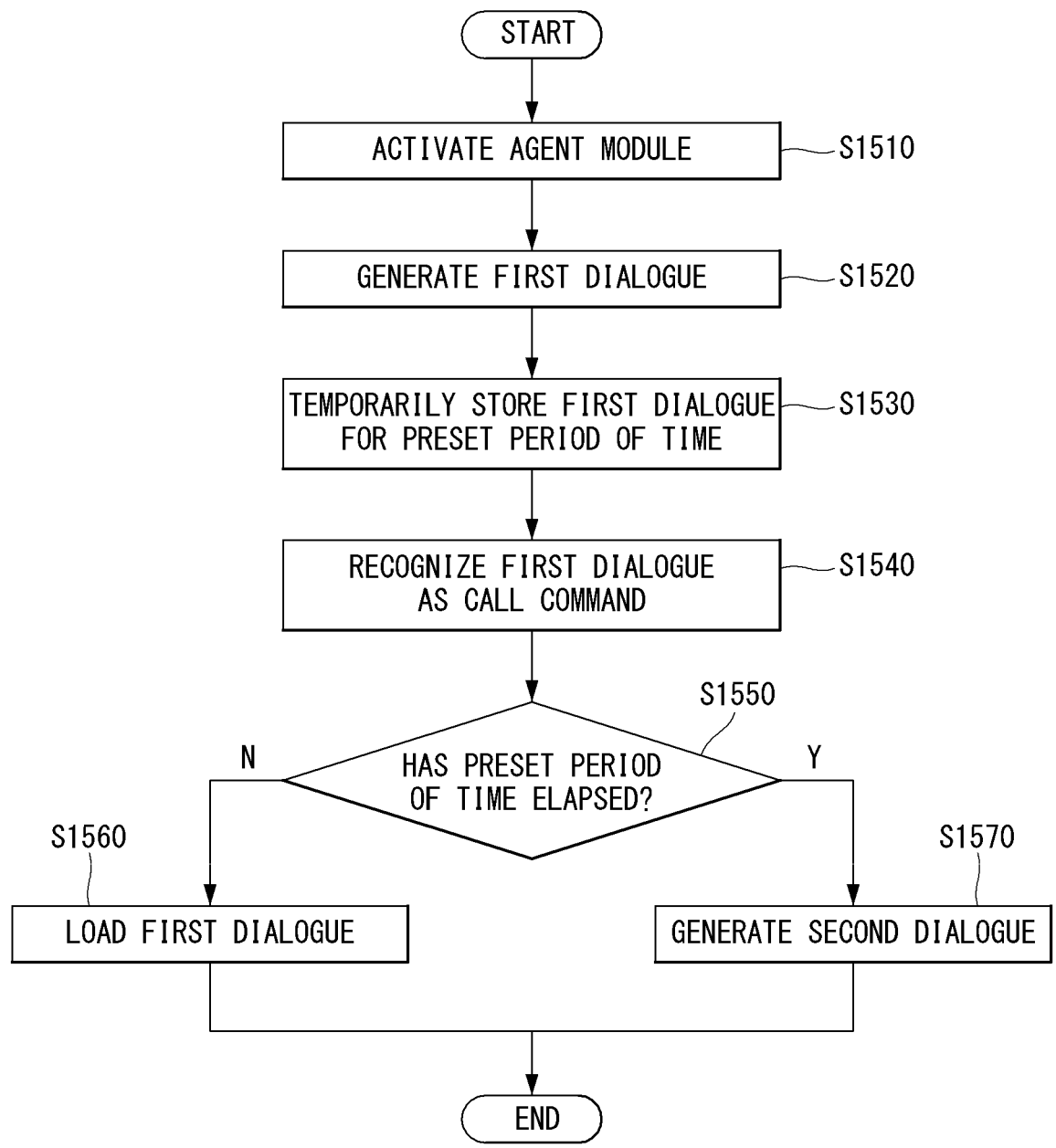

Referring to FIG. 15, the processor 170 may activate the agent module 141 (S1510). The processor 170 may generate a first dialogue (S1520). The processor 170 may temporarily store the first dialogue for a preset period of time (S1530). The processor 170 may recognize a command input by the occupant 900 to call the first dialogue (S1540). The processor 170 may determine whether the first dialogue is called within the preset period of time or after elapse of the preset period of time (S1550). If the first dialogue is called within the preset period of time, the processor 170 may call the first dialogue (S1560). If the first dialogue is called after the elapse of the preset period of time, the processor 170 may generate a second dialogue (S1570).

Figure 16:
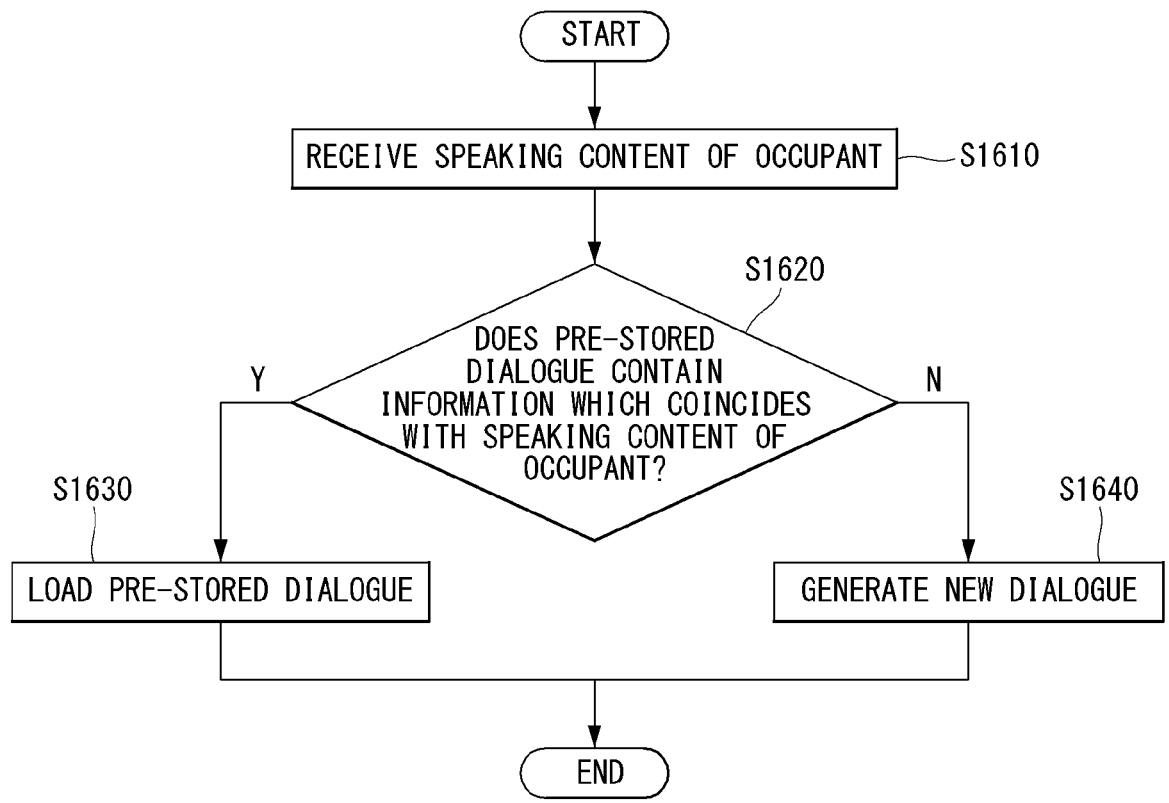

Referring to FIG. 16, the processor 170 may receive speaking content of the occupant 900 (S1610). The processor 170 may determine whether a pre-stored dialogue contains information coinciding with the speaking content of the occupant 900 (S1620). If a dialogue containing information coinciding with the speaking content of the occupant 900 exists, the processor 170 may load the dialogue (S1630). If no dialogue containing information coinciding with the speaking content of the occupant 900 exists, the processor 170 may generate a new dialogue (S1640).

Figure 17:
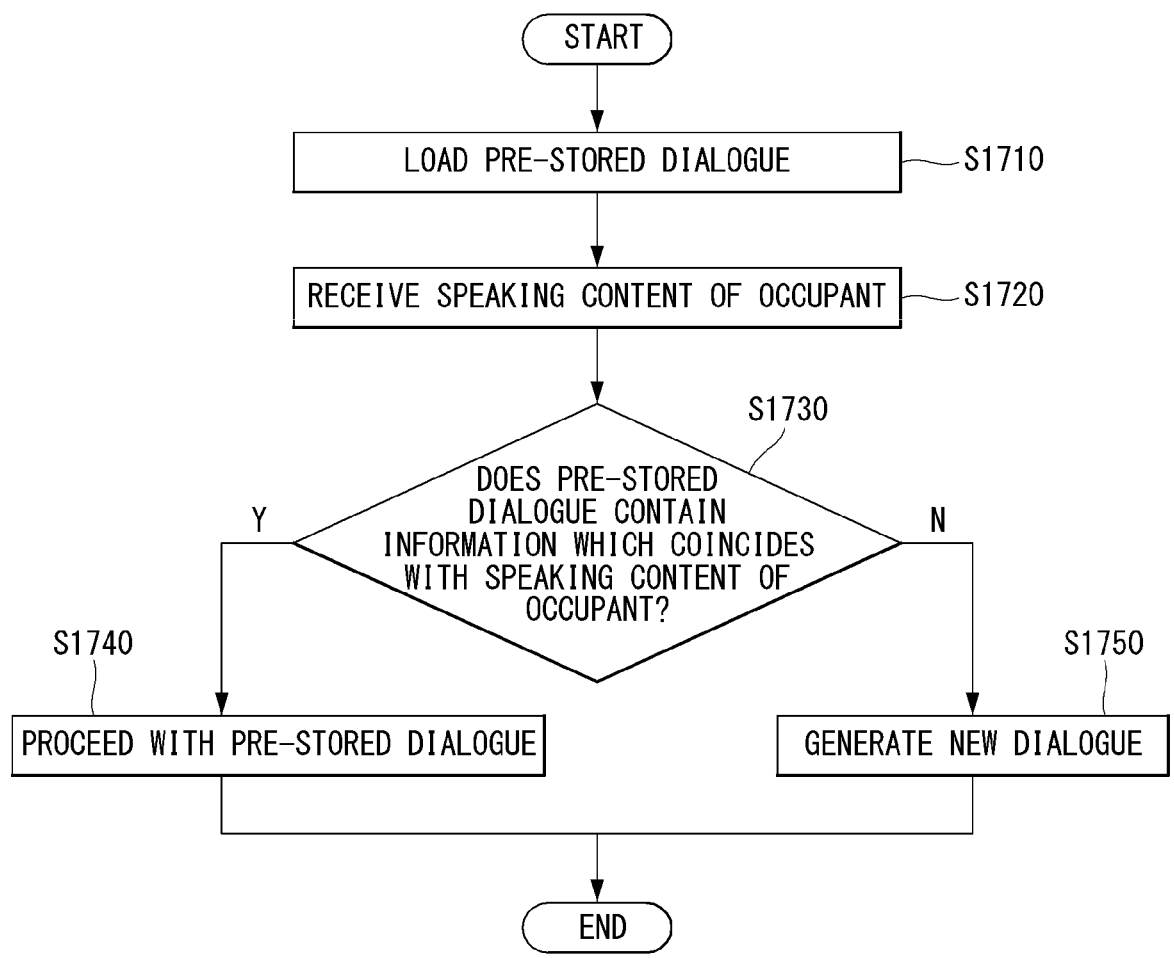

Referring to FIG. 17, the processor 170 may load a pre-stored dialogue (S1710). The processor 170 may receive speaking content of the occupant 900 (S1720). The processor 170 may determine whether the loaded dialogue contains information coinciding with the speaking content of the occupant 900 (s1730). If information coinciding with the speaking content of the occupant 900 is contained in the loaded dialogue, the processor 170 may proceed with conversation using the loaded dialogue (S1740). If information coinciding with the speaking content of the occupant 900 is not contained in the loaded dialogue, the processor 170 may generate a new dialogue (s1750).

Figure 18:
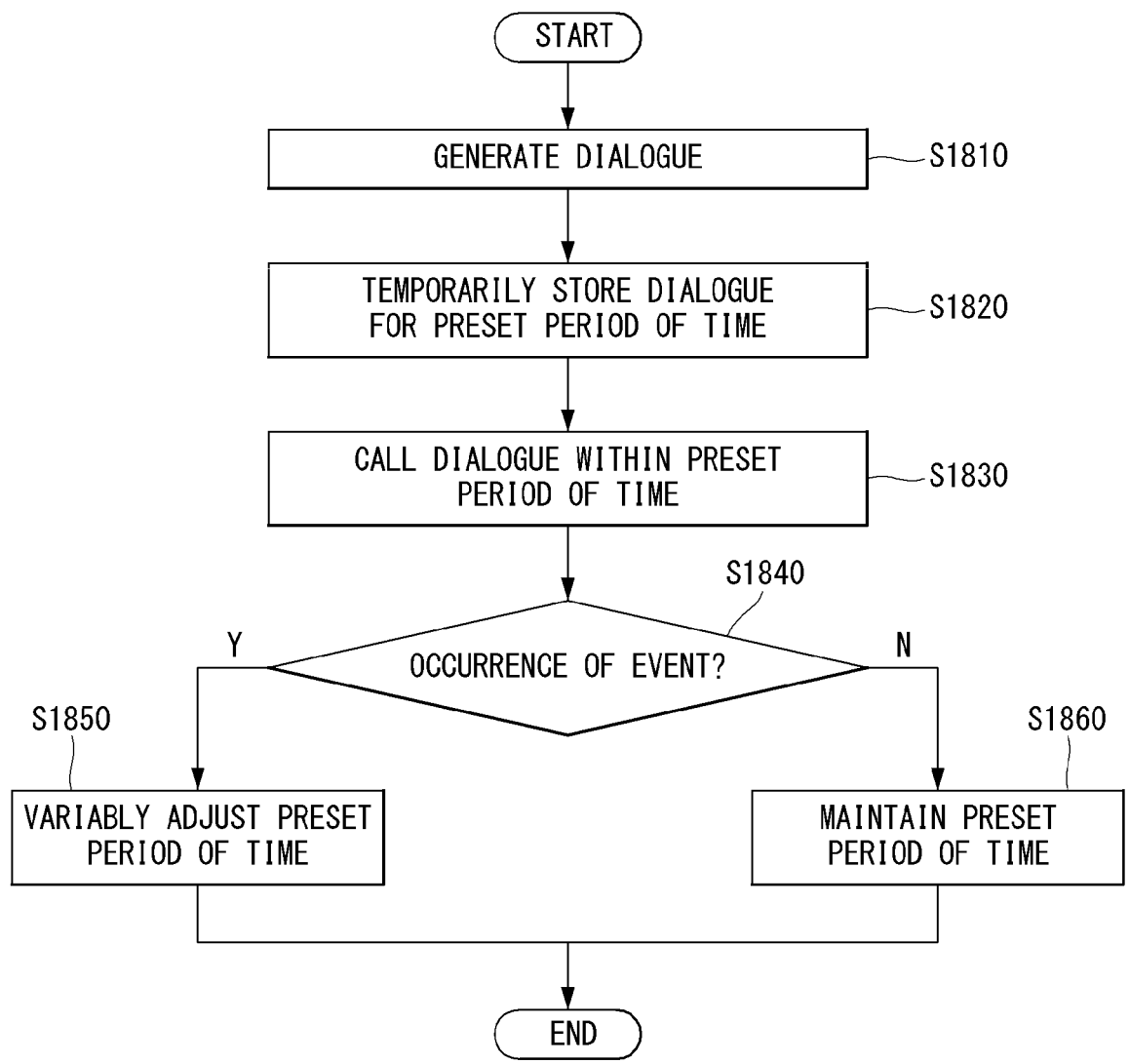

Referring to FIG. 18, the processor 170 may generate a dialogue (S1810). The processor 170 may temporarily store the dialogue for a preset period of time (S1820). If there is a call from the occupant 900 within the preset period of time, the processor 170 may load the pre-stored dialogue (s1830). The processor 170 may sense whether an event has occurred (S1840). If the event has occurred, the processor 170 may variably adjust the preset period of time (S1850). If the event has not occurred, the processor 170 may maintain the preset period of time (S1860).

Figure 19:
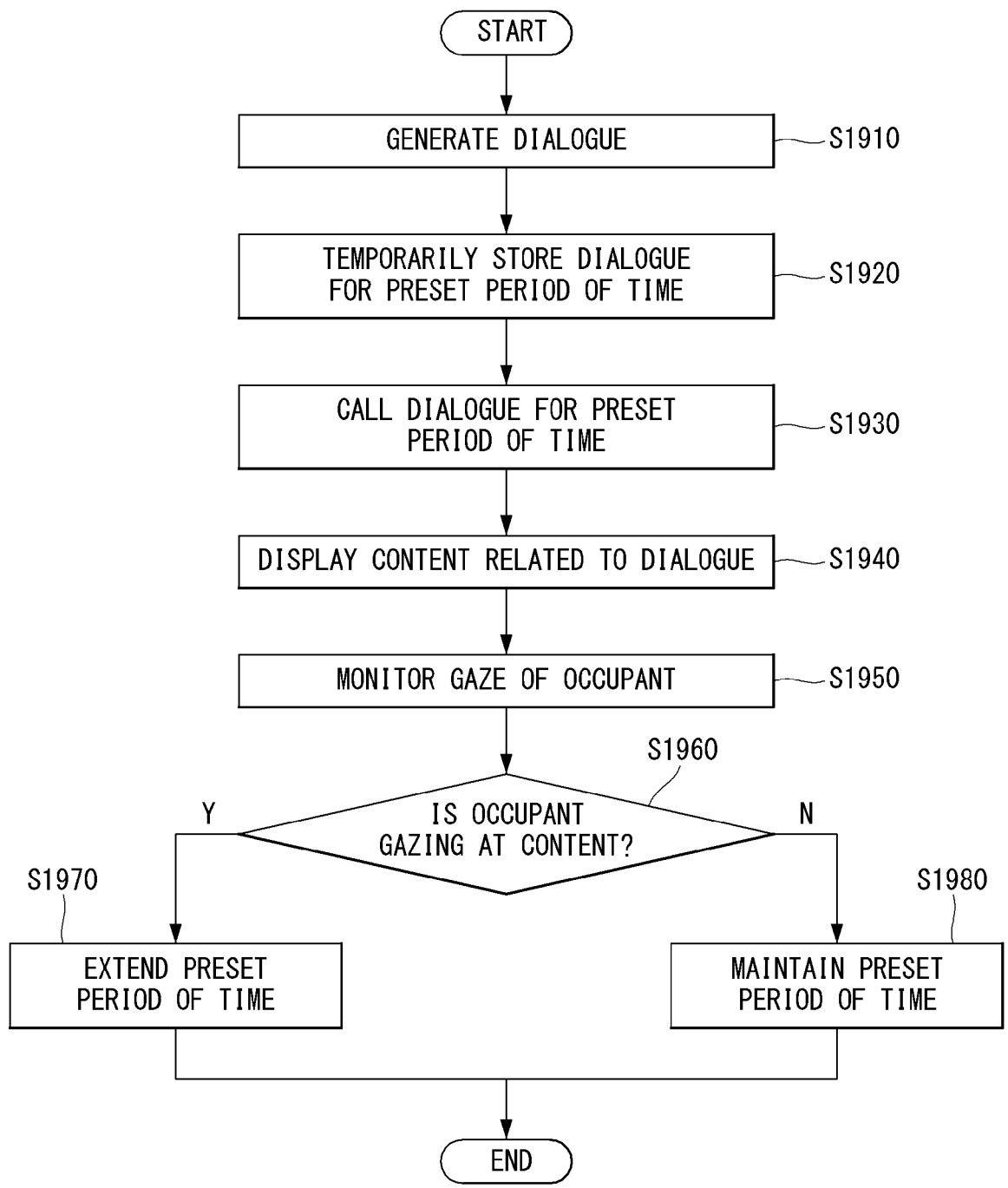

Referring to FIG. 19, the processor 170 may generate a dialogue (S1910). The processor 170 may temporarily store the dialogue for a preset period of time (S1920). If there is a call from the occupant 900 within the preset period of time, the processor 170 may load the pre-stored dialogue (S1930). The processor 170 may display a content related to the called dialogue (S1940). The processor 170 may monitor a gaze of the occupant (S1950). The processor 170 may determine whether the occupant 900 is gazing at the content (S1960). If it is determined that the occupant 900 is gazing at the content, the processor 170 may extend the preset period of time (S1970). If it is determined that the occupant 900 is not gazing at the content, the processor 170 may maintain the preset period of time (S1980).

Figure 20:
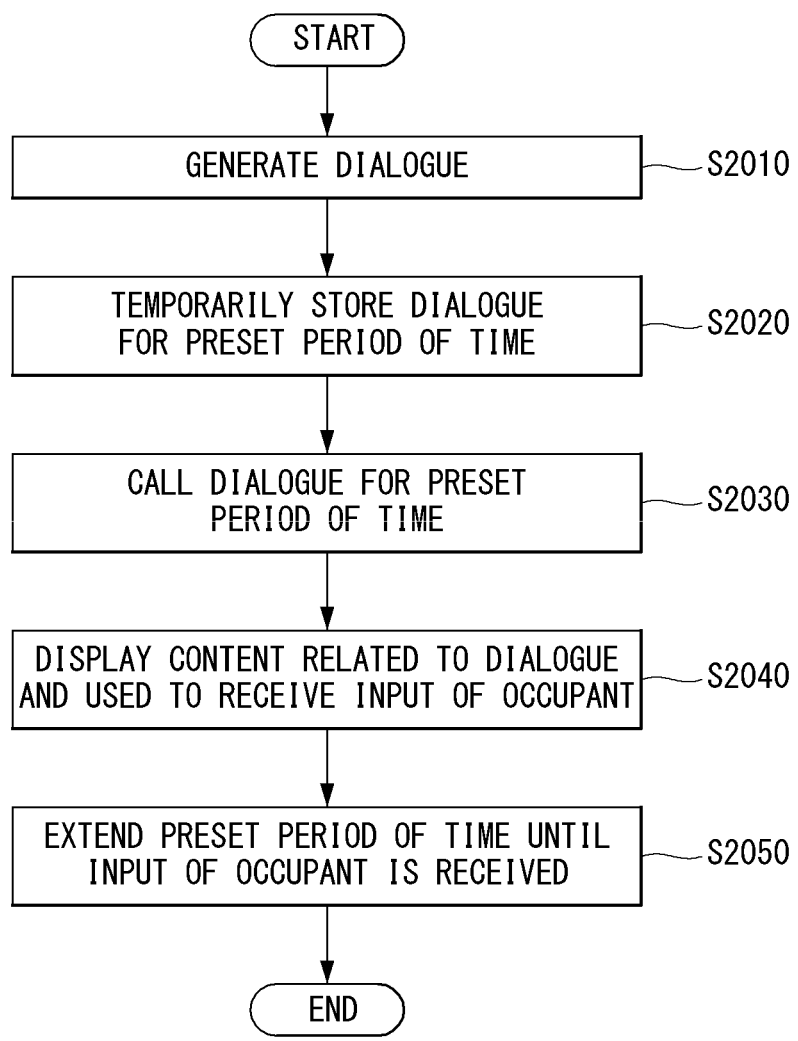

Referring to FIG. 20, the processor 170 may generate a dialogue (S2010). The processor 170 may temporarily store the dialogue for a preset period of time (S2020). If there is a call from the occupant for the preset period of time, the processor 170 may load the pre-stored dialogue (S2030). The processor 170 may display a content for receiving an input of the occupant 900 (S2040). The processor 170 may extend the preset period of time until the input of the occupant 900 is received (S2050).

Figure 21:
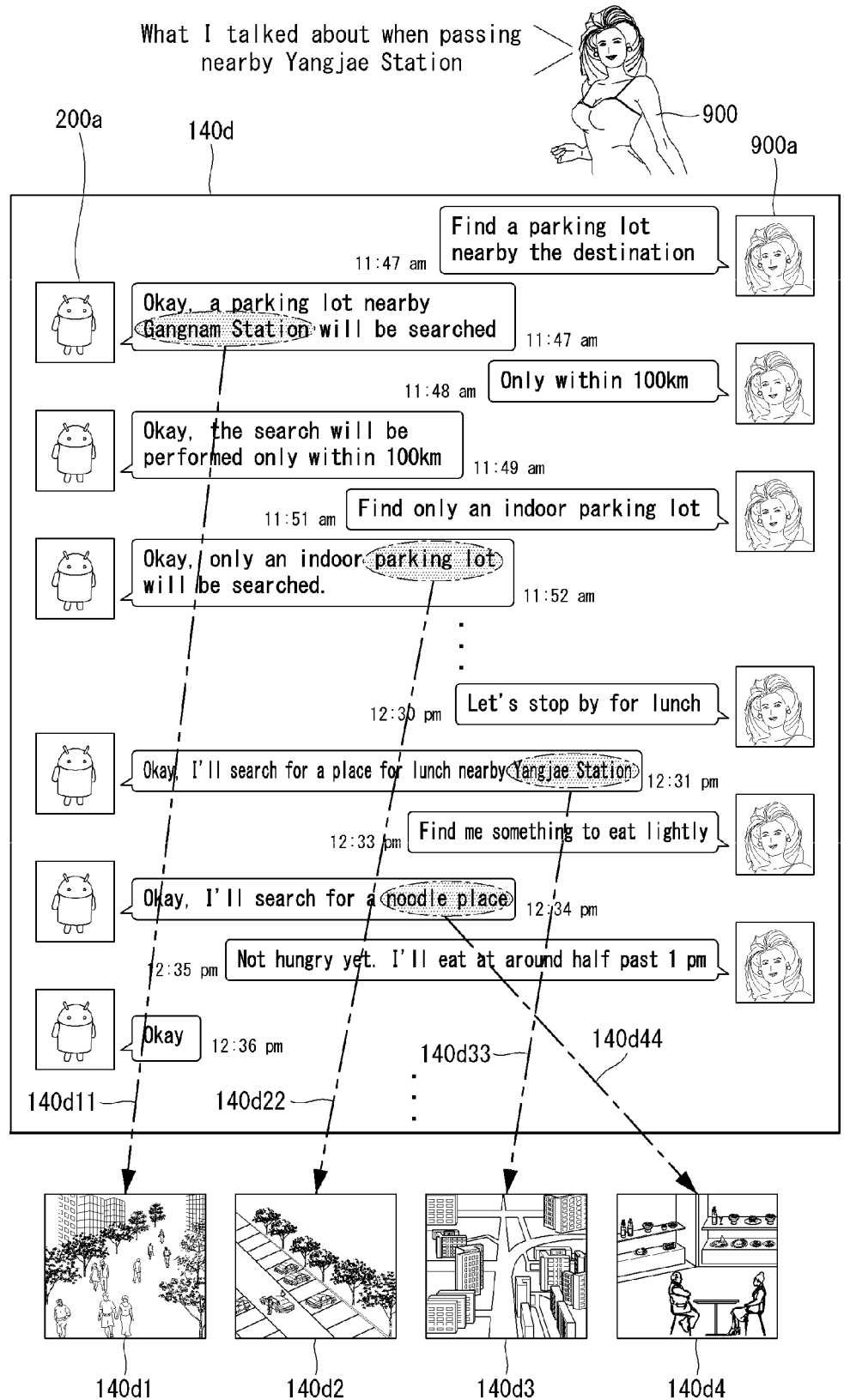
Figure 22:
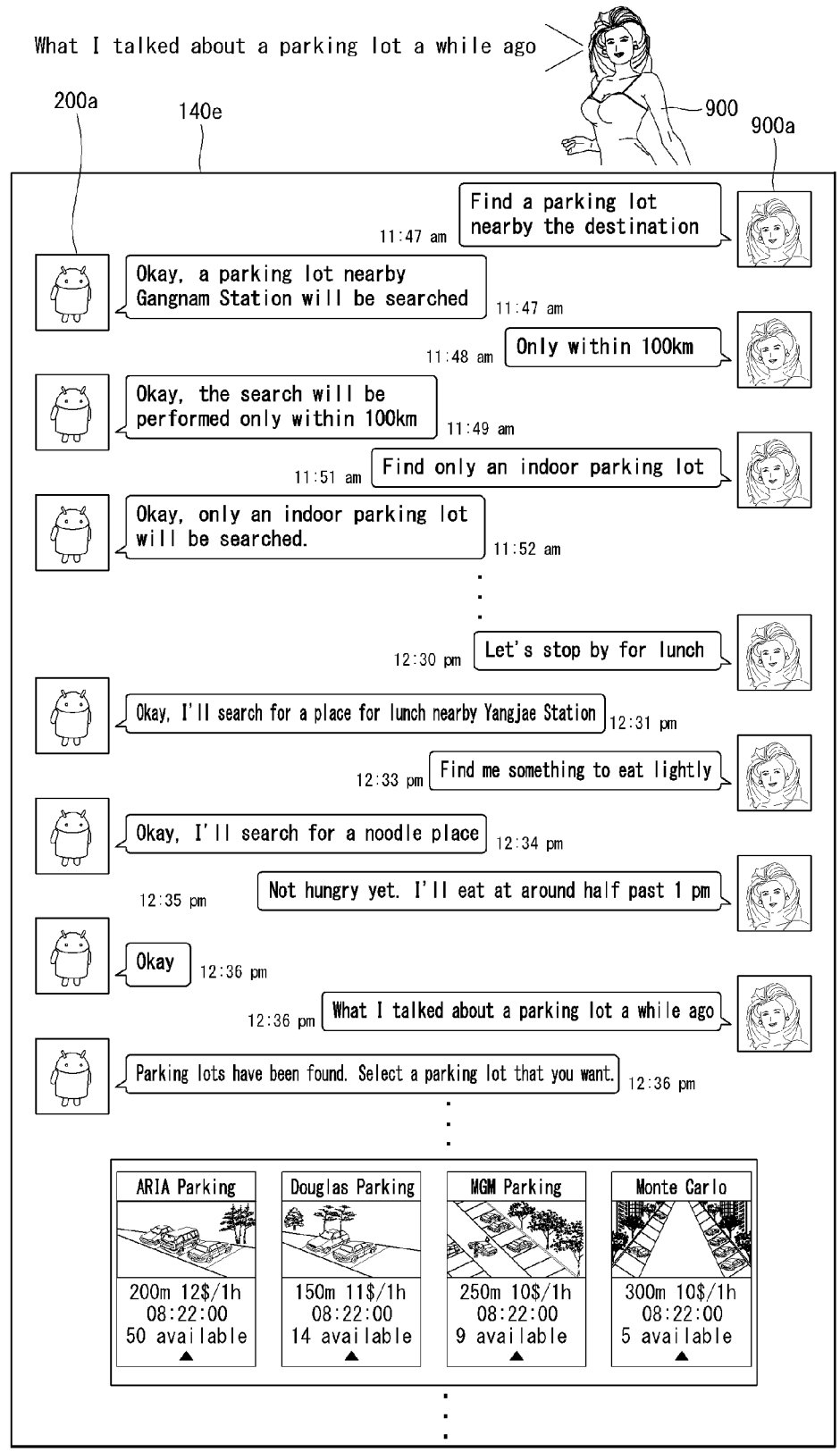

Referring to FIGS. 21 and 22, a dialogue may include a plurality of conversation topics that can be classified into categories. For example, the occupant 900 may speak "What I talked about when passing nearby Yangjae Station". The processor 170 may load a related dialogue based on speaking content of the occupant 900. The loaded dialogue may include a parking lot-related topic and a lunch-related topic.

The processor 170 may display images 140d1, 140d2, 140d3, and 140d4 as contents related to conversation topics. Along with indicators 140d11, 140d22, 140d33, and 140d44, the images 140d1, 140d2, 140d3, and 140d4 may serve as notifying a user of a plurality of conversation topics in the dialogue. The occupant 900 may keep talking about a related conversation topic while viewing the images 140d1, 140d2, 140d3, and 140d4 and the indicators 140d11, 140d22, 140d33, and 140d44.

Referring to FIG. 22, in a state that a dialogue is loaded, the processor 170 may search for and sense a conversation topic related to the speaking content in the dialogue. The processor 170 may resume conversation regarding the topic related to the speaking content of the occupant 900. The resumed conversation may is continued subsequent to the latest conversation in the dialogue. The processor 170 may display that the resumed conversation is about the topic related to the speaking content of the occupant 900. This may be referred to as a context dialog.

The processor 170 may display the context dialogue through the display unit 180. The loaded dialogue may be displayed as an image 140e. The occupant 900 may speak "What I talked about a parking lot a while ago". The processor 170 may search for conversation related to the parking lot in the loaded dialogue. The processor 170 may sense a topic of conversation about searching for a parking lot nearby Gangnam Station in the loaded dialogue, and eventually senses that an indoor parking lot was a search target in the conversation topic. The processor 170 may display a response "Parking lots have been found. Please select a parking lot that you want" so as to indicate that the context dialogue is in process. The processor 170 may display found parking lots to be selected by the occupant. While viewing content images 140d1, 140d2, 140d3, and 140d4 related to the conversation topic and indicators 140d11, 140d22, 140d33, and 140d44, the occupant 900 may continue talking about a related conversation topic.

Figure 23:
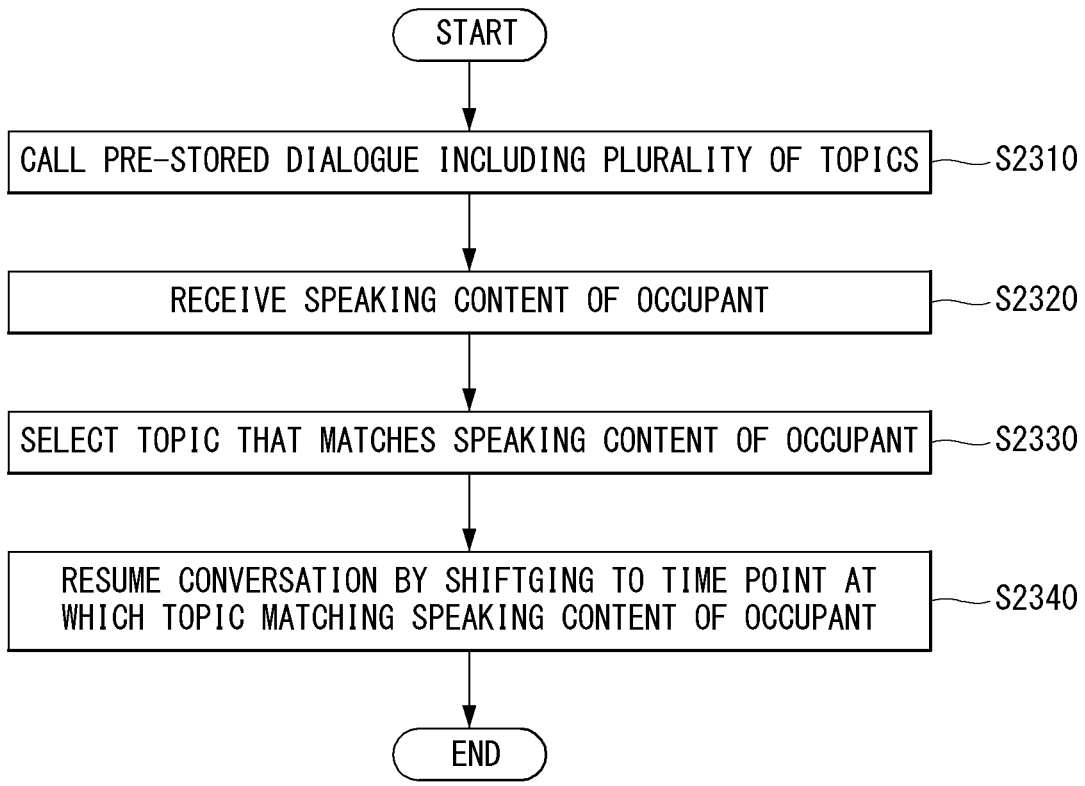

Referring to FIG. 23, the processor 170 may call a pre-stored dialogue including a plurality of pre-stored topics or a conversation topic (S2310). The processor 170 may receive speaking content of the occupant 900 (S2320). The processor 170 may search for and select a conversation topic matching the speaking content of the occupant 900 (S2330). The processor 170 may resume the conversation by shifting to a time point at which the topic matching the speaking content of the occupant 900 was stored (S2340). Alternatively, the processor 170 may resume conversation about a topic related to the speaking content of the occupant 900 (S2340).

Figure 24:
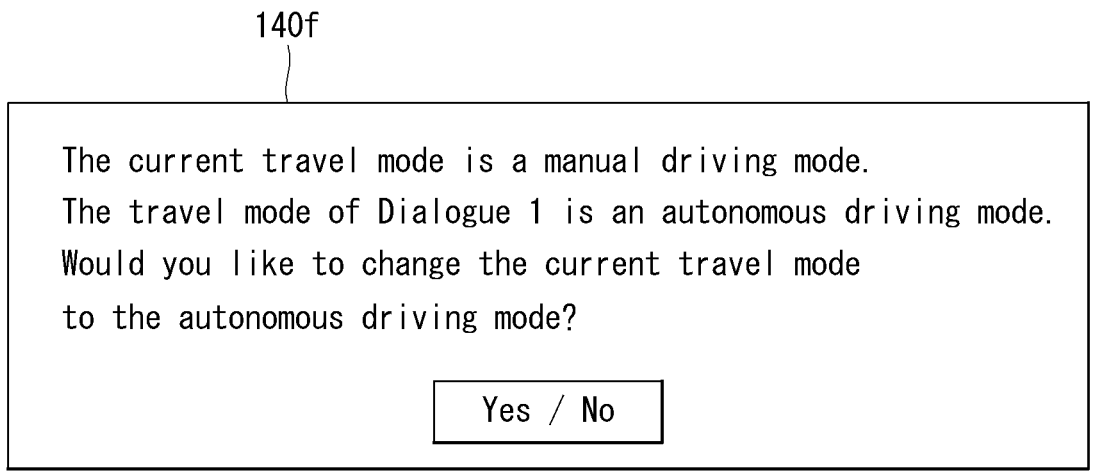

Referring to FIG. 24, a travel mode of a dialogue to be loaded and a current travel mode of the vehicle 700 may be different. For example, the current travel mode of the vehicle 700 may be a mode in which the occupant 900 drives the vehicle manually. On the other hand, the travel mode of the dialogue to be called may be an autonomous driving mode, based on which conversation can be proceeded with.

If the travel mode of the dialogue to be loaded and the current travel mode of the vehicle 700 are different, the processor 170 may display an image indicating that dialogue loading is restricted. For example, the processor 170 may display an image 140f guiding the occupant to transition a travel mode. Alternatively, the processor 170 may display an image to notify the occupant 900 that the travel mode will be automatically transitioned. After a preset period of time elapses, the processor 170 may automatically change the travel mode.

For example, the vehicle 700 may be controlled in any one travel mode from among a first travel mode in which the vehicle is manually controlled by the occupant 900, a second travel mode in which the vehicle is controlled in a partially autonomous traveling state, and a third travel mode in which an autonomous traveling state can be maintained without manipulation of the occupant. In addition, when a request to load a dialogue generated in a travel mode of a level equal to or higher than the second travel mode is received while the vehicle 700 is controlled in the first travel mode, the processor 170 may guide transition of the travel mode of the vehicle 700 to the second control mode or a higher level.

Figure 25:
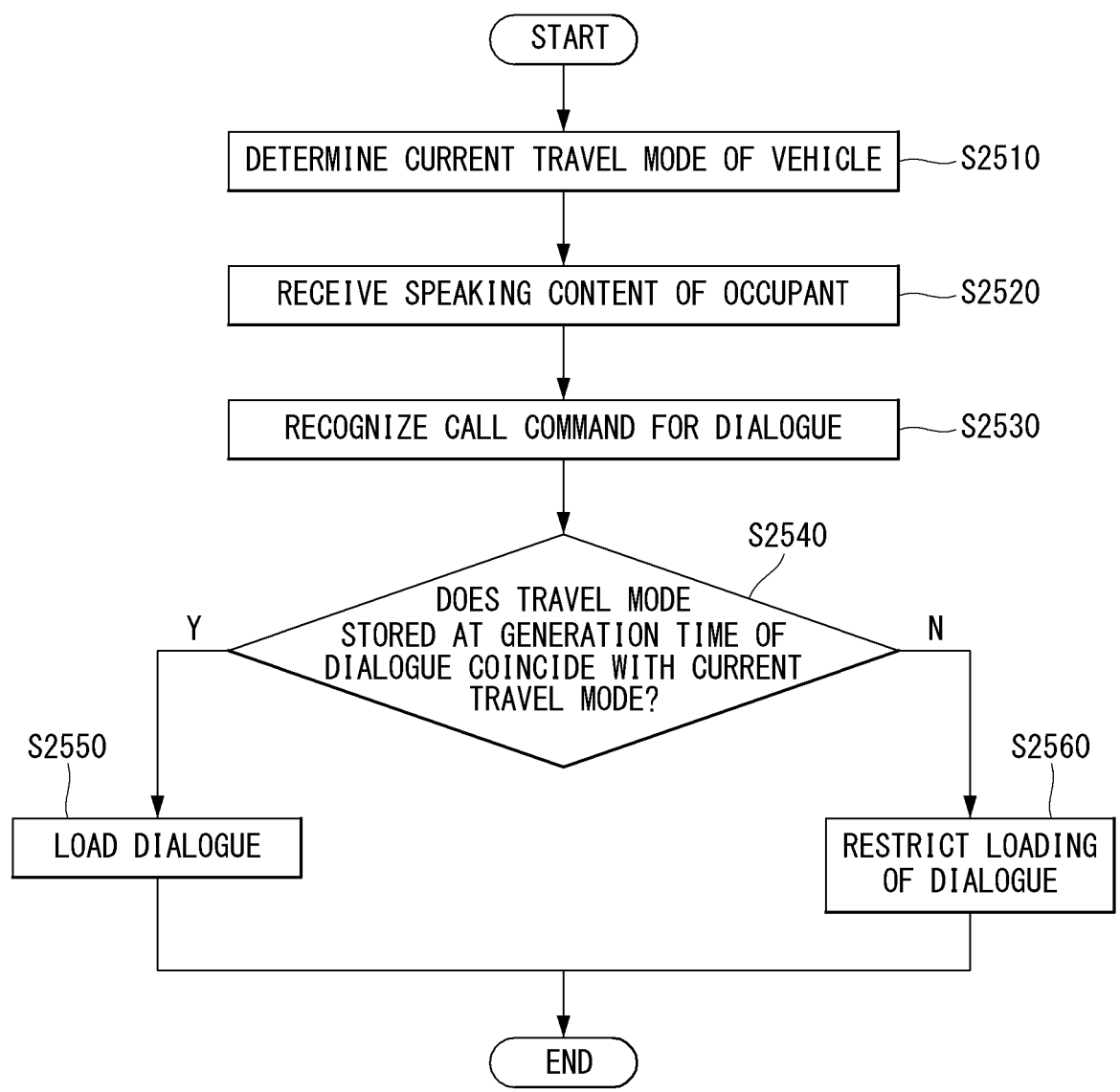

Referring to FIG. 25, the processor 170 may determine a current travel mode of the vehicle 700 (S2510). The processor 170 may receive speaking content of the occupant 900 (S2520). The processor 170 may recognize a call command for a dialogue, and search for the dialogue to be loaded (S2530). The processor 170 may determine whether a travel mode corresponding to a generation time of the dialogue to be loaded matches the current travel mode of the vehicle 700 (S2540). If the travel mode of the dialogue to be loaded matches the current travel mode of the vehicle 700, the processor 170 may proceed with loading the dialogue (S2550). If the travel mode of the dialogue to be loaded is different from the current travel mode of the vehicle 700, the processor 170 may restrict loading of the dialogue (S1560).

Embodiment 1: A control method for controlling a vehicle using an agent module which outputs a dialogue-type response to an input speaking of an occupant, the method including: activating the agent module through a predetermined input; generating a first dialogue with the occupant through an activated voice input unit; maintaining the first dialogue in a temporary stored state for a preset period of time; and loading the first dialogue in the temporary stored state when a call command for the first dialogue is recognized, and generating a second dialogue when the call command for the first dialogue is recognized after elapse of the preset period of time.

Embodiment 2: The control method of Embodiment 1, wherein the generating of the first dialogue is performed for a first period of time.

Embodiment 3: The control method of Embodiment 2, wherein the preset period of time is defined as a second period of time which comes after the first period of time, and which is longer than the first period of time.

Embodiment 4: The control method of Embodiment 3, wherein when the call command for the first dialogue is recognized within the preset period of time, at least a part of the first dialogue in the temporary stored state is loaded.

Embodiment 5 The control method of Embodiment 1, wherein the preset period of time is variably adjusted according to an event that occurs while the first dialogue is generated.

Embodiment 6: The control method of Embodiment 5, wherein when it is determined through a camera in the vehicle that communication between the occupant and the agent module is temporarily interrupted while the first dialogue is generated, the preset period of time is controlled to extend by a period of time for which the communication is interrupted.

Embodiment 7: The control method of Embodiment 5, further including: displaying at least one content related to at least one of the following: the speaking of the occupant and the response of the agent module, which form the first dialogue, and wherein, while the first dialogue is generated, a gaze of the occupant is monitored through a camera in the vehicle, and, when it is determined that the occupant has been gazing at a specific content for a predetermined period of time, the preset period of time is controlled to extend.

Embodiment 8: The control method of Embodiment 5, further including displaying a content related to at least one of the following: the speaking of the occupant and the response of the agent module, which form the first dialogue, wherein, when a plurality of contents related to the at least one exists, the preset period of time is controlled to extend until an input for selecting a specific content from among the plurality of contents is received.

Embodiment 9: The control method of Embodiment 5, wherein the event includes an event of receiving a call, and wherein when the agent module automatically responds to the received call, the preset period of time is controlled to extend by a period of time for which an automatic response operation is performed by the agent module.

Embodiment 10: The control method of Embodiment 1, further including, when no call command for the first dialogue has been recognized for the preset period of time, storing, in a memory, the first dialogue maintained in the temporary stored state.

Embodiment 11: The control method of Embodiment 1, wherein the first dialogue includes at least one of the following: a time point when the occupant speaks, location information of the vehicle, route information, a destination, a start location, a waypoint, speaking content of the occupant, and response content of the agent module.

Embodiment 12: The control method of Embodiment 1, further including: receiving a speaking of the occupant through the voice input unit while the first dialogue is temporarily stored and the agent module is deactivated within the preset period of time; and, when any one information item contained in the first dialogue is contained in the speaking of the occupant, reactivating the agent module.

Embodiment 13: The control method of Embodiment 12, further including: after the agent module is re-activated, receiving a speaking of the occupant through the voice input unit; when any one information item in information contained in the first dialogue is selected through the speaking of the occupant, re-activating the first dialogue; and, when there is no matching information item between the speaking of the occupant and the information contained in the first dialogue, generating a third dialogue.

Embodiment 14: The control method of Embodiment 13, further comprising: when the information contained in the first dialogue includes at least one topic capable of being classified as a category and the speaking of the occupant is recognized as selecting any one subject among the at least one subject, constructing a context dialogue so that conversation with the occupant about the selected topic resumes subsequent to a time point stored right before the first dialogue is re-activated.

Embodiment 15: The control method of Embodiment 1, further including: displaying, on a display, a plurality of stored dialogues generated by the agent module; and, when any one of the plurality of dialogues is selected through the speaking of the occupant, re-activating the selected dialogue.

Embodiment 16: The control method of Embodiment 1, wherein the vehicle is capable of being controlled in any one travel mode from the following: a first travel mode in which the vehicle is manually controlled by the occupant, a second travel mode in which the vehicle is controlled in a partially autonomous traveling state, and a third travel mode in which the vehicle is capable of maintaining an autonomous traveling state without manipulation of the occupant, and wherein the control method further includes: in a case where the first dialogue is to be loaded, determining the travel mode when the first dialogue is generated; determining a current travel mode; and, when a travel mode corresponding to a generation time of the first dialogue matches the current travel mode, loading the first dialogue.

Embodiment 17: The control method of Embodiment 16, further including: when a request to load a dialogue generated in a travel mode of a level equal to or higher than the second travel mode is received while the vehicle is controlled in the first travel mode, restricting loading of the requested dialogue; and guiding transition of the travel mode of the vehicle to the level equal to or higher than the second travel mode.

Embodiment 18: The control method of Embodiment 17, further including: when a predetermined period of time has elapsed after the transition of the travel mode is guided, transitioning the travel mode to the second mode; and loading the requested dialogue.

Embodiment 19: The control method of Embodiment 1, wherein the generating of the second dialogue includes generating the second dialogue when the first dialogue does not exist in pre-stored dialogues after a call command for the first dialogue is received.

Embodiment 20: The control method of Embodiment 2, further including deactivating the voice input unit when the first period of time elapses.

Embodiment 20: The control method of Embodiment 1, wherein the generating of the first dialogue further includes: receiving information by the agent module through a wireless communication unit from an external server; and, based on the information received from the external server, outputting a response to the speaking of the occupant.

Embodiment 23: A control device including: a voice input unit receiving a speaking of an occupant; an agent module generating (or outputting) a dialogue-type response to the speaking of the occupant; a memory storing the dialogue generated by the agent module; and a controller generating, through the agent module which is activated, a first dialogue with the occupant through an activated voice input unit and, when a predetermined condition is satisfied, maintaining the first dialogue in a temporary stored state for a preset period of time, wherein the controller loads the first dialogue in the temporary stored state when a call command for the first dialogue is recognized, and generates a second dialogue when the call command for the first dialogue is recognized after elapse of the preset period of time.

Embodiment 24: The control device of Embodiment 23, wherein the gent module generates the first dialogue for a first period of time.

Embodiment 25: The control method of Embodiment 24, wherein the preset period of time is defined as a second period of time which comes after the first period of time, and which is longer than the first period of time.

Embodiment 26: The control device of Embodiment 25, wherein when the call command for the first dialogue is recognized within the preset period of time, the controller loads at least a part of the first dialogue in the temporary stored state.

Embodiment 27: The control device of Embodiment 23, wherein the preset period of time is variably adjusted according to an event that occurs while the first dialogue is generated.

Embodiment 28: The control device of Embodiment 27, wherein when it is determined through a camera in the vehicle that communication between the occupant and the agent module is temporarily interrupted while the first dialogue is generated, the controller controls the preset period of time to extend by a period of time for which the communication is interrupted.

Embodiment 29: The control device of Embodiment 27, wherein the controller controls to display at least one content related to at least one of the following: the speaking of the occupant and the response of the agent module, which form the first dialogue, to monitor a gaze of the occupant through a camera in the vehicle while the first dialogue is generated, and to control the preset period of time to extend when it is determined that the occupant has been gazing at a specific content for a predetermined period of time.

Embodiment 30: The control device of Embodiment 27, wherein the controller controls to display a content related to at least one of the following: the speaking of the occupant and the response of the agent module, which form the first dialogue, and, when a plurality of contents related to the at least one exists, to extend the preset period of time until an input for selecting a specific content from among the plurality of contents is received.

Embodiment 31: The control device of Embodiment 27, wherein the event includes an event of receiving a call, and wherein when the agent module automatically responds to the received call, the controller controls to extend the preset period of time by a period of time for which an automatic response operation is performed by the agent module.

Embodiment 32: The control device of Embodiment 23, wherein when no call command for the first dialogue has been recognized for the preset period of time, the controller stores, in a memory, the first dialogue maintained in the temporary stored state.

Embodiment 33: The control device of Embodiment 23, wherein the first dialogue includes at least one of the following: a time point when the occupant speaks, location information of the vehicle, route information, a destination, a start location, a waypoint, speaking content of the occupant, and response content of the agent module.

Embodiment 34: The control device of Embodiment 23, wherein the controller receives a speaking of the occupant through the voice input unit while the first dialogue is temporarily stored and the agent module is deactivated within the preset period of time, and reactivates the agent module when any one information item contained in the first dialogue is contained in the speaking of the occupant.

Embodiment 35: The control device of Embodiment 34, wherein in a case where a speaking of the occupant is received through the voice input unit after the agent module is re-activated, when any one information item in information contained in the first dialogue is selected through the speaking of the occupant, the controller re-activates the first dialogue and, when there is no matching information item between the speaking of the occupant and the information contained in the first dialogue, generates a third dialogue.

Embodiment 36: The control device of Embodiment 35, wherein, when the information contained in the first dialogue includes at least one topic capable of being classified as a category and the speaking of the occupant is recognized as selecting any one subject among the at least one subject, the controller constructs a context dialogue so that conversation with the occupant about the selected topic resumes subsequent to a time point stored right before the first dialogue is re-activated.

Embodiment 37: The control device of Embodiment 23, wherein the controller displays, on a display, a plurality of stored dialogues generated by the agent module and, when any one of the plurality of dialogues is selected through the speaking of the occupant, re-activates the selected dialogue.

Embodiment 38: The control device of Embodiment 23, wherein the vehicle is capable of being controlled in any one travel mode from the following: a first travel mode in which the vehicle is manually controlled by the occupant, a second travel mode in which the vehicle is controlled in a partially autonomous traveling state, and a third travel mode in which the vehicle is capable of maintaining an autonomous traveling state without manipulation of the occupant, and wherein in a case where the first dialogue is to be loaded, the controller determines the travel mode when the first dialogue is generated, determines a current travel mode, and, when a travel mode corresponding to a generation time of the first dialogue matches the current travel mode, loads the first dialogue.

Embodiment 39: The control device of Embodiment 38, wherein the controller restricts loading of the requested dialogue when a request to load a dialogue generated in a travel mode of a level equal to or higher than the second travel mode is received while the vehicle is controlled in the first travel mode, and guides transition of the travel mode of the vehicle to the level equal to or higher than the second travel mode.

Embodiment 40: The control device of Embodiment 39, wherein when a predetermined period of time has elapsed after the transition of the travel mode is guided, the controller transitions the travel mode to the second mode and loads the requested dialogue.

Embodiment 41: The control device of Embodiment 23, wherein when the first dialogue does not exist in pre-stored dialogues after a call command for the first dialogue is received. The controller generates the second dialogue.

Embodiment 42: The control device of Embodiment 24, wherein when the first period of time elapses. The controller deactivates the voice input unit.

Embodiment 43: The control device of Embodiment 23, wherein the generating by the controller of the first dialogue includes: receiving information by the agent module through a wireless communication unit from an external server; and, based on the information received from the external server, outputting a response to the speaking of the occupant to thereby generate the first dialogue.

Effects of the control device according to the present invention are as follows. According to at least one of the embodiments of the present invention, a control device for assisting driving of a vehicle may be provided. According to at least one of the embodiments of the present invention, a control device capable of having conversation with an occupant during traveling may be provided. According to at least one of the embodiments of the present invention, a control device capable of providing information desired by an occupant in response to speaking of the occupant during traveling may be provided. According to at least one of the embodiments of the present invention, a control device capable of loading a pre-stored dialogue in response to speaking of an occupant during traveling may be provided. According to at least one of the embodiments of the present invention, a control device capable of providing a context dialogue so as to resume conversation with an occupant when the conversation is temporarily interrupted may be provided.

Effects of the control method according to the present invention are as follows. According to at least one of the embodiments of the present invention, a control method for assisting driving of a vehicle may be provided. According to at least one of the embodiments of the present invention, a control method for enabling conversation with an occupant during traveling may be provided. According to at least one of the embodiments of the present invention, a control device for providing information desired by an occupant in response to speaking of the occupant during traveling may be provided. According to at least one of the embodiments of the present invention, a control method for loading a pre-stored dialogue in response to speaking of an occupant during traveling may be provided. According to at least one of the embodiments of the present invention, a control method for providing a context dialogue so as to resume conversation with an occupant when the conversation is temporarily interrupted may be provided.

The control device or the control method according to the above-described embodiments may assist a driver to drive the vehicle. The control device or the control method according to the above-described embodiments may assist the vehicle to travel autonomously or semi-autonomously.

The above described features, configurations, effects, and the like are included in at least one of the implementations of the present disclosure, and should not be limited to only one implementation. In addition, the features, configurations, effects, and the like as illustrated in each implementation may be implemented with regard to other implementations as they are combined with one another or modified by those skilled in the art. Thus, content related to these combinations and modifications should be construed as being included in the scope of the accompanying claims.

Further, although the implementations have been mainly described until now, they are just exemplary and do not limit the present disclosure. Thus, those skilled in the art will understand that various modifications and applications which have not been exemplified may be carried out within a range which does not deviate from the essential characteristics of the implementations. For instance, the constituent elements described in detail in the exemplary implementations can be modified to be carried out. Further, the differences related to such modifications and applications shall be construed to be included in the scope of the present disclosure specified in the attached claims.

The invention claimed is:

1. A control method for controlling a vehicle using an agent module that includes a processor which outputs a dialogue response to an input speaking of an occupant, the method comprising:
  activating the agent module through a predetermined input;
  generating a first dialogue with the occupant through an activated voice input unit;
  maintaining the first dialogue in a temporary stored state for a preset period of time;
  loading the first dialogue in the temporary stored state when a call command for the first dialogue is recognized, and generating a second dialogue when the call command for the first dialogue is recognized after elapse of the preset period of time;
  in a case where the first dialogue is to be loaded, determining a travel mode when the first dialogue is generated;
  determining a current travel mode;
  in a case where a travel mode corresponding to a generation time of the first dialogue matches the current travel mode, loading the first dialogue;
  when a request to load a dialogue generated in a travel mode of a level equal to or higher than a second travel mode is received while the vehicle is controlled in a first travel mode, restricting loading of the requested dialogue; and
  controlling transition of the travel mode of the vehicle to the level equal to or higher than the second travel mode,
  wherein the vehicle is capable of being controlled in any one travel mode from the following: the first travel mode in which the vehicle is manually controlled by the occupant, the second travel mode in which the vehicle is controlled in a partially autonomous traveling state, and a third travel mode in which the vehicle is capable of maintaining an autonomous traveling state without manipulation of the occupant.

2. The control method of claim 1, wherein the generating of the first dialogue is performed for a first period of time.

3. The control method of claim 2, wherein the preset period of time is defined as a second period of time which comes after the first period of time, and which is longer than the first period of time.

4. The control method of claim 3, wherein when the call command for the first dialogue is recognized within the preset period of time, at least a part of the first dialogue in the temporary stored state is loaded.

5. The control method of claim 2, further comprising deactivating the voice input unit when the first period of time elapses.

6. The control method of claim 1, wherein the preset period of time is variably adjusted according to an event that occurs while the first dialogue is generated.

7. The control method of claim 6, wherein when it is determined through a camera in the vehicle that communication between the occupant and the agent module is temporarily interrupted while the first dialogue is generated, the preset period of time is controlled to extend by a period of time for which the communication is interrupted.

8. The control method of claim 6, further comprising: displaying at least one content related to at least one of the following: the input speaking of the occupant and the response of the agent module, which form the first dialogue,
  wherein, while the first dialogue is generated, a gaze of the occupant is monitored through a camera in the vehicle, and, when it is determined that the occupant has been gazing at a specific content for a predetermined period of time, the preset period of time is controlled to extend.

9. The control method of claim 6, further comprising displaying a content related to at least one of the following: the input speaking of the occupant and the response of the agent module, which form the first dialogue,
  wherein, when a plurality of contents related to the at least one exists, the preset period of time is controlled to extend until an input for selecting a specific content from among the plurality of contents is received.

10. The control method of claim 6,
  wherein the event comprises an event of receiving a call, and
  wherein when the agent module automatically responds to the received call, the preset period of time is controlled to extend by a period of time for which an automatic response operation is performed by the agent module.

11. The control method of claim 1, further comprising, when no call command for the first dialogue has been recognized for the preset period of time, storing, in a memory, the first dialogue maintained in the temporary stored state.

12. The control method of claim 1, wherein the first dialogue comprises at least one of the following: a time point when the occupant speaks, location information of the vehicle, route information, a destination, a start location, a waypoint, speaking content of the occupant, and response content of the agent module.

13. The control method of claim 1, further comprising:
receiving the input speaking of the occupant through the voice input unit while the first dialogue is temporarily stored and the agent module is deactivated within the preset period of time; and
when any one information item contained in the first dialogue is contained in the speaking of the occupant, reactivating the agent module.

14. The control method of claim 13, further comprising:
after the agent module is re-activated, receiving the input speaking of the occupant through the voice input unit;
when any one information item in information contained in the first dialogue is selected through the input speaking of the occupant, re-activating the first dialogue; and
when there is no matching information item between the input speaking of the occupant and the information contained in the first dialogue, generating a third dialogue.

15. The control method of claim 14, further comprising:
when the information contained in the first dialogue comprises at least one topic capable of being classified as a category and the input speaking of the occupant is recognized as selecting any one subject among at least one subject, constructing a context dialogue so that conversation with the occupant about the selected topic resumes subsequent to a time point stored right before the first dialogue is re-activated.

16. The control method of claim 1, further comprising:
displaying, on a display, a plurality of stored dialogues generated by the agent module; and
when any one of the plurality of dialogues is selected through the input speaking of the occupant, re-activating the selected dialogue.

17. The control method of claim 1, further comprising:
when a predetermined period of time has elapsed after the transition of the travel mode is guided, transitioning the travel mode to the second mode; and
loading the requested dialogue.

18. The control method of claim 1, wherein the generating of the second dialogue comprises generating the second dialogue when the first dialogue does not exist in pre-stored dialogues after the call command for the first dialogue is received.

* * * * *